United States Patent
Bian et al.

(10) Patent No.: US 12,041,259 B2
(45) Date of Patent: Jul. 16, 2024

(54) DATA PROCESSING METHODS AND SYSTEMS, AND ELECTRONIC DEVICES

(71) Applicant: BOE TECHNOLOGY GROUP CO., LTD., Beijing (CN)

(72) Inventors: Yi Bian, Beijing (CN); Kai Zhao, Beijing (CN); Genyu Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 216 days.

(21) Appl. No.: 17/770,600

(22) PCT Filed: Jul. 6, 2021

(86) PCT No.: PCT/CN2021/104745
§ 371 (c)(1),
(2) Date: Apr. 20, 2022

(87) PCT Pub. No.: WO2022/042053
PCT Pub. Date: Mar. 3, 2022

(65) Prior Publication Data
US 2023/0024148 A1    Jan. 26, 2023

(30) Foreign Application Priority Data
Aug. 31, 2020   (CN) .......................... 202010899685.3

(51) Int. Cl.
*H04N 19/48*  (2014.01)
*H04N 19/176*  (2014.01)

(52) U.S. Cl.
CPC ........... *H04N 19/48* (2014.11); *H04N 19/176* (2014.11)

(58) Field of Classification Search
CPC ...... H04N 19/48; H04N 19/176; H04N 19/93; H04N 19/42; H04N 19/44
See application file for complete search history.

(56) References Cited

U.S. PATENT DOCUMENTS 4,673,987 A * 6/1987 Toyokawa ............. H04N 19/93
382/237
9,734,550 B1 * 8/2017 Archambault ............ G06T 1/60
(Continued)

FOREIGN PATENT DOCUMENTS

CN      1531209 A     9/2004
CN    102281469 A    12/2011
(Continued)

OTHER PUBLICATIONS

Bing, Study of run-length coding algorithm, Journal of Tianjin Institute of Technology, Dec. 2001, pp. 77-81, vol. 17 No. 4, Tianjin China.

*Primary Examiner* — Joseph Suh
(74) *Attorney, Agent, or Firm* — IP & T GROUP LLP

(57) ABSTRACT

A data processing method includes: acquiring first image data including pixel values that are arranged consecutively and divided into data blocks, each data block occupying one byte and including at least one pixel value; and compressing, according to at least one compression parameter, at least one data set to be compressed in the first image data into a corresponding compression unit, so as to obtain second image data including the compression unit. The data set to be compressed includes at least two data groups arranged consecutively and identical. Each data group includes a single data block or at least two data blocks arranged consecutively. The at least one compression parameter includes a first length configured to represent the number of at least one data block in a data group. The compression unit includes one data group and a second length configured to represent the number of data groups.

18 Claims, 10 Drawing Sheets

(56) References Cited

U.S. PATENT DOCUMENTS

2004/0178933 A1    9/2004  Umeda
2006/0115170 A1*  6/2006  Brakus, Jr. ............. H04N 1/419
                                                                  382/245
2011/0038551 A1*  2/2011  Pandey .................. H04N 19/93
                                                                  382/232

FOREIGN PATENT DOCUMENTS

| CN | 103139567 A | 6/2013 |
| CN | 101667843 B | 12/2013 |
| CN | 108616280 A | 10/2018 |

* cited by examiner

200

100

DATA PROCESSING METHODS AND SYSTEMS, AND ELECTRONIC DEVICES

CROSS-REFERENCE TO RELATED APPLICATIONS

This application is a national phase entry under 35 USC 371 of International Patent Application No. PCT/CN2021/104745 filed on Jul. 6, 2021, which claims priority to Chinese Patent Application No. 202010899685.3, filed on Aug. 31, 2020, which are incorporated herein by reference in their entirety.

TECHNICAL FIELD

The present disclosure relates to the field of display technologies, and in particular, to data processing methods and data processing systems, and electronic devices.

BACKGROUND

With the development of technologies, electronic devices, such as display apparatuses, are becoming more and more intelligent, functions thereof are more diversified, and the mutual transmission of resources between different electronic devices is also becoming more and more extensive.

SUMMARY

In an aspect, a data processing method is provided. The data processing method includes: acquiring first image data; compressing at least one data set to be compressed in the first image data into a corresponding compression unit according to at least one compression parameter, so as to obtain second image data including the compression unit. The first image data includes a plurality of pixel values that are arranged consecutively. The plurality of pixel values are divided into a plurality of data blocks according to an arranging order of the pixel values, and each data block occupies one byte and includes at least one pixel value. A data set to be compressed includes at least two data groups that are arranged consecutively and identical. Each data group includes any of a single data block and at least two data blocks arranged consecutively. The at least one compression parameter include a first length, the first length is configured to characterize a number of at least one data block in a data group. The compression unit includes one data group in the data set to be compressed and a second length, the second length is configured to characterize a number of the at least two data group in the data set to be compressed.

In some embodiments, compressing the at least one data set to be compressed in the first image data into the corresponding compression unit according to the at least one compression parameter includes: reading, from data to be compressed of the first image data, data groups sequentially according to the first length; determining, from a first data group, whether a next data group is identical to a current data group one by one, until the next data group is different from the current data group, or a number of identical data groups exceeds a set value, wherein the identical data groups constitute the data set to be compressed including the at least two data groups; and generating, according to one data group in the identical data groups and the second length, a compression unit corresponding to the data set to be compressed.

In some embodiments, compressing the at least one data set to be compressed in the first image data into the corresponding compression unit according to the at least one compression parameter further includes: setting the second length to be 0 or 1; and adding, from the first data group, 1 to the second length in response to determining that the next data group is identical to the current data group, until the next data group is different from the current data group, or the number of the identical data groups exceeds the set value, so as to obtain the second length that characterizes the number of the identical data groups in the data set to be compressed.

In some embodiments, the at least one compression parameter further includes a third length; the third length is configured to characterize an amount of storage space of the compression unit. Generating, according to one data group in the identical data groups and the second length, the compression unit corresponding to the data set to be compressed includes: writing one data group in the data set to be compressed and the second length into storage space having the third length, so as to generate the compression unit corresponding to the data set to be compressed.

In some embodiments, the data group included in the compression unit is the first data group in the data set to be compressed.

In some embodiments, reading, from the data to be compressed of the first image data, the data groups sequentially according to the first length includes: other than the first data group, comparing a length of processed data with a length of the first image data before each data group is obtained; and in response to determining that the length of the processed data is less than the length of the first image data, obtaining a data group from the data to be compressed of the first image data.

In some embodiments, the at least one compression parameter includes a plurality groups of compression parameters, and the plurality groups of compression parameters are not exactly same. Compressing the at least one data set to be compressed in the first image data into the corresponding compression unit according to the at least one compression parameter, so as to obtain the second image data including the compression unit includes: compressing the data set to be compressed in the first image data into the corresponding compression unit according to at least one compression parameter in each of the plurality groups of compression parameters, so as to generate a plurality of third image data each including the compression unit; and selecting, from the plurality of third image data, third image data with a smallest length or third image data with a length less than a threshold as the second image data.

In some embodiments, compressing the at least one data set to be compressed in the first image data into the corresponding compression unit according to the at least one compression parameter includes: in a case where the data to be compressed in the first image data is not empty, and a number of bytes occupied by the data to be compressed is less than a number of bytes occupied by one data group, writing zeros after the data to be compressed, so as to complement the data to be compressed into one data group.

In some embodiments, the second image data further includes the at least one compression parameter.

In some embodiments, the number of the at least one data block included in the data group is any of 1 to 4.

In another aspect, a data processing method is provided. The data processing method includes: acquiring second image data; the second image data including at least one compression unit, and the compression unit including one data group and a second length; and decompressing the compression unit in the second image data into a corresponding decompressed data set according to at least one compression parameter, so as to obtain fourth image data. The at least one compression parameter includes a first length, and the first length is configured to characterize a number of at least one data block in the data group. The second length is configured to characterize a number of data groups in the decompressed data set corresponding to the compression unit. The decompressed data set includes at least two data groups that are arranged consecutively. Each data group includes any of a single data block and at least two data blocks arranged consecutively. The fourth image data includes a plurality of data blocks that are arranged consecutively, and each data block includes at least one of a plurality of pixel values that are arranged consecutively.

In some embodiments, decompressing the compression unit in the second image data into the corresponding decompressed data set according to the at least one compression parameter includes: reading the data group in the compression unit according to the first length; and copying the data group according to the second length, so as to generate the decompressed data set.

In some embodiments, the at least one compression parameter further includes a third length, the third length is configured to characterize an amount of storage space of the compression unit. Decompressing the compression unit in the second image data into the corresponding decompressed data set according to the at least one compression parameter further includes: reading the compression unit in the second image data according to the third length, and decompressing the compression unit into the corresponding decompressed data set.

In some embodiments, the second image data further includes a length of the first image data. The data processing method further includes: in a case where a length of decompressed data is greater than a length of the first image data, deleting a portion, at an end of the decompressed data and exceeding the length of the first image, of data, so as to obtain the first image data.

In yet another aspect, an electronic device is provided. The electronic device includes a memory and a processor. The processor is coupled to the memory. The memory has stored therein one or more computer program instructions. The processor is configured to execute the one or more computer program instructions, so that the electronic device implements the data processing method as described in any of the above embodiments.

In yet another aspect, a data processing system is provided. The data processing system includes a first electronic device and a second electronic device. The first electronic device is coupled to the second electronic device. The first electronic device is configured to implement the data processing method as described in any of the above embodiments. The second electronic device is configured to implement the data processing method as described in any of the above embodiments.

In yet another aspect, a non-transient computer-readable storage medium is provided. The non-transient computer-readable storage medium has stored thereon computer program instructions that, when run on a computer, cause the computer to execute the data processing method as described in any of the above embodiments.

In yet another aspect, a computer program product is provided. The computer program product includes computer program instructions that, when run on a computer, cause the computer to execute the data processing method as described in any of the above embodiments.

In yet another aspect, a computer program is provided. When the computer program is run on a computer, the computer program causes the computer to execute the data processing method as described in any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on actual sizes of products, actual processes of methods and actual timings of signals to which the embodiments of the present disclosure relate.

DETAILED DESCRIPTION

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" and "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are only used for descriptive purposes, and are not to be construed as indicating or implying relative importance or implicitly indicating the number of indicated technical features. Thus, features defined by "first" and "second" may explicitly or implicitly include one or more of the features. In the description of the embodiments of the present disclosure, the term "a plurality of" or "the plurality of" means two or more unless otherwise specified.

In the description of some embodiments, the expressions "coupled" and "connected" and their extensions may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The use of the phrase "applicable to" or "configured to" herein means an open and inclusive language, which does not exclude devices that are applicable to or configured to perform additional tasks or steps.

Figure 1:
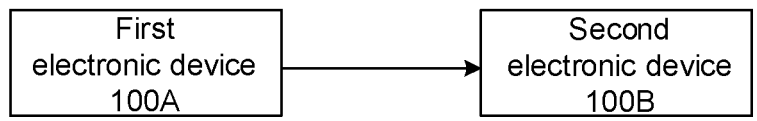
FIG. 1 is a structural diagram of a data processing system, in accordance with some embodiments.

Embodiments of the present disclosure provide a data processing system 200. As shown in FIG. 1, the data processing system 200 includes a first electronic device 100A and a second electronic device 100B that are coupled to each other.

For example, the first electronic device 100A may establish a connection with the second electronic device 100B through a wireless communication mode, such as Wireless Fidelity (Wi-Fi), wireless network, bluetooth, and the like. For example, the second electronic device 100B is connected with a wireless router or a wireless access point (AP) through a wireless communication mode or a wired communication mode, and the first electronic device 100A is connected with the wireless router or the wireless AP through a wireless communication mode, and is thus connected with the second electronic device 100B. Of course, the communication connection manner is not limited thereto in the embodiments of the present disclosure. For example, the second electronic device 100B and the first electronic device 100A may also be connected through a wired communication mode.

The first electronic device 100A and the second electronic device 100B may be applied in various scenarios. For example, the first electronic device 100A may be a desktop computer, a portable computer, a network server, a personal digital assistant (PDA), a mobile phone, a tablet computer, a wireless terminal device, or an embedded device. The second electronic device 100B may be a mobile phone, a tablet computer, a wearable device, a vehicle-mounted device, an augmented reality (AR)/virtual reality (VR) device, a notebook computer, an ultra-mobile personal computer (UMPC), a netbook, or a personal digital assistant. The types of the first electronic device 100A and the second electronic device 100B are not limited in the embodiments of the present disclosure.

Figure 2:
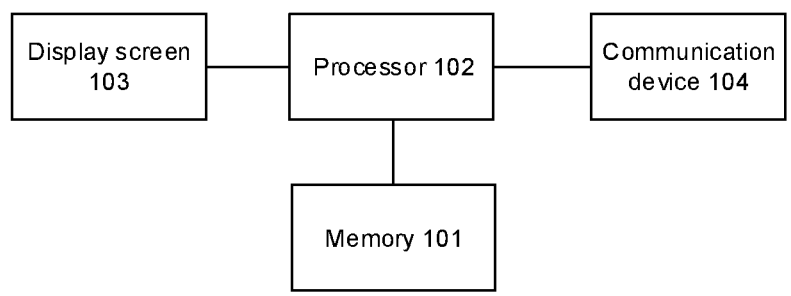
FIG. 2 is a structural diagram of an electronic device, in accordance with some embodiments.

Embodiments of the present disclosure provide an electronic device 100. As shown in FIG. 2, the electronic device 100 includes a memory 101 and a processor 102. The memory 101 is coupled to the processor 102.

The memory 101 has stored therein one or more computer program instructions that may run on the processor 102.

The processor 102, when executing the computer program instructions, causes the electronic device to implement the data processing method as described in the following embodiments.

For example, the processor 102 may be a processor, or may be a collective name of a plurality of processing elements. For example, the processor 102 may be a general-purpose central processing unit (CPU), a microprocessor, an application specific integrated circuit (ASIC), or one or more integrated circuits used for controlling the execution of programs of the solutions of the present disclosure, such as one or more microprocessors, or one or more field programmable gate arrays (FPGAs).

The memory 101 may be a memory, or may be a collective name of a plurality of storage elements, and is used to store executable program codes. For example, the memory may be a read-only memory (ROM) or a static storage device of any other type that may store static information and instructions, a random access memory (RAM) or a dynamic storage device of any other type that may store information and instructions, or an electrically erasable programmable read-only memory (EEPROM), a compact disc read-only memory (CD-ROM) or any other compact disc storage, an optical disc storage (including a compact disc, a laser disc, an optical disc, a digital versatile disc, a blu-ray disc), a magnetic disc storage medium or any other magnetic storage device, or any other medium that may be used to carry or store desired program codes in a form of instructions or data structures and can be accessed by a computer, but it is not limited thereto.

The memory 101 is used for storing computer program instructions (e.g., application program codes) for implementing the solutions of the present disclosure, and the execution of the computer program instructions is controlled by the processor 102. The processor 102 is used for executing the computer program instructions stored in the memory 101, so as to control the electronic device 100 to implement the data processing method provided by the following embodiments of the present disclosure.

In some embodiments, the first electronic device 100A and the second electronic device 100B in the data processing system 200 may both adopt the above-mentioned electronic device 100. That is, the data processing system 200 includes two electronic devices 100 that communicate with each other, one electronic device 100 is used as the first electronic device 100A, and another electronic device 100 is used as the second electronic device 100B.

In some embodiments, as shown in FIG. 2, the electronic device 100 further includes a display screen 103 and a communication device 104. The display screen 103 and the communication device 104 are both coupled to the processor 102. The display screen 103 is configured to display images under control of the processor 102, for example, the display screen 103 is an electronic ink screen. The communication device 104 is a device for information interaction with an external device (an AP or a wireless router), which may send data or commands to the external device or receive data or commands sent by the external device under control of the processor 102. For example, the communication device 104 may be a transceiver, a transceiving circuit, a transmitter, a receiver, and the like. For example, the communication device 104 may be a wireless communication device such as a Wi-Fi device or a bluetooth device, or a wired communication device such as a universal serial bus (USB) interface. The Wi-Fi device provides the electronic device 100 with a network access that complies with Wi-Fi-related standard protocols. The bluetooth device may be an integrated circuit or a bluetooth chip, and the like. As an example, the communication device 104 and the processor 102 may be provided separately or integrated together.

In the process of data transmission between the two electronic devices 100, for example, the first electronic device 100A obtains a piece of image data (e.g., first image data below), processes (e.g., compresses) the piece of image data to obtain compressed image data (e.g., second image data below), and sends the compressed image data to the second electronic device 100B. Correspondingly, the second electronic device 100B receives the compressed image data, processes (e.g., decompresses) the compressed image data to obtain decompressed image data (e.g., fourth image data below), and the second electronic device 100B may display according to the decompressed image data.

For example, the first electronic device 100A is configured to control the images (i.e., pictures) displayed on the second electronic device 100B. The first electronic device 100A may not display, for example, the first electronic device 100A may not include a display screen. In this case, the first electronic device 100A may be a server or a terminal. The terminal may be a personal computer (PC), such as a desktop computer, a notebook computer, a tablet computer, or an ultrabook. The terminal may also be a handheld terminal such as a mobile phone. For example, the first electronic device 100A and the second electronic device 100B may also both be display apparatuses.

For example, in a case where the electronic device 100 (e.g., the second electronic device 100B) is a display apparatus, the display apparatus may be a display, and may also be a product including a display, such as an electronic paper display (EPD) apparatus, a television, a computer (an all-in-one machine or a desktop computer), a tablet computer, a mobile phone, an electronic picture screen. The electronic paper display apparatus may be applied to various scenarios. For example, the electronic paper display apparatus may be an electronic reader, an intelligent tag (also referred to as an electronic tag), an electronic timepiece (e.g., an electronic watch), a thermometer, a bus stop sign, or an oil price tag in a gas station. The intelligent tag may include an electronic price tag that may be placed on a shelf in a supermarket, convenience store, pharmacy and the like, a luggage tag, or a medicine tag on a medicine package.

At present, some electronic devices with low power consumption can be widely applied to scenarios such as supermarkets, offices, and transportation. For example, an EPD electronic device has advantages such as low power consumption, energy saving, eye protection and the like, and can be applied to a small-sized electronic device such as a handheld electronic reader device (e.g., an e-book) or a shelf tag. The EPD electronic device (or the EPD display apparatus) can update the display content in a way of wireless transmission. Since the EPD electronic device is mainly used in low-power-consumption scenarios, in a process of directly transmitting an uncompressed image, although it may be guaranteed that the image size is fixed, the large amount of data transmitted easily leads to a long data transmission time, which causes the power consumption of the display apparatus to be relatively large and thus affects the performance of the display apparatus. Moreover, both a hashrate and storage space (such as an RAM) of the processor of the EPD electronic device are relatively small. In a process of processing data, the capability requirement for the processor of the display apparatus is relatively high, so that it is difficult for the EPD electronic device to process (e.g., compress or decompress) data.

For example, a base image (or a background image) may be pre-stored in the electronic device, or the base image may be separately transmitted to the electronic device, and only text information is updated, so as to reduce the transmission time. However, in this case, the electronic device needs to be provided with a built-in word library chip, and requires a relatively large hashrate and relatively large storage space to generate images of Chinese characters, which will increase the cost and power consumption of the electronic device. In addition, the base image is difficult to be changed, so that the display of the electronic device is monotonous. For example, some compression algorithms with a high compression ratio (i.e., a ratio of occupied space size before compression to actual occupied space size) of image data can be used, such as JPEG (joint photographic experts group) format compression algorithm, TIFF (tag image file format) compression algorithm, GIF (graphic interchange format) compression algorithm and RAW format compression algorithm, so as to reduce the amount of data transmitted and shorten the transmission time. However, in this case, the electronic device requires a relatively large hashrate during decompression, and relatively large storage space (e.g., a random access memory) is occupied, so that the cost of the electronic device may increase.

Figure 3:
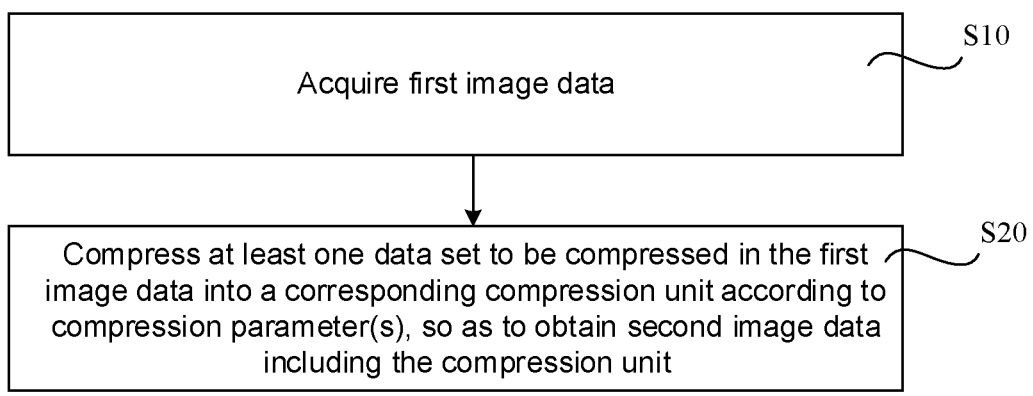
FIG. 3 is a flow diagram of a data processing method, in accordance with some embodiments.

Embodiments of the present disclosure provide a data processing method. The data processing method may be applied to the above electronic device 100, for example, to the first electronic device 100A. As shown in FIG. 3, the data processing method includes the following steps (S10 and S20).

In S10, first image data is acquired. The first image data includes a plurality of pixel values that are arranged consecutively. The plurality of pixel values are divided into a plurality of data blocks according to an arranging order of the pixel values, and each data block occupies one byte and includes at least one pixel value.

For example, the arranging order of the plurality of pixel values in the first image data is related to the display order of pixels when a first image corresponding to the first image data is displayed. For example, if the pixels display in a row-by-row manner when the first image is displayed, the plurality of pixel values in the first image data are also arranged row by row. For example, for each row of pixels, pixel values of a pixel in a first column to a pixel in a last column are arranged sequentially, and for two adjacent rows of pixels, a pixel value of a pixel in the next row and first column is arranged after a pixel value of a pixel in the previous row and last column. For example, referring to FIG. 4A, the first image data is displayed in a row-by-row manner through pixels arranged in i rows and j columns, where i and j are both positive integers, and the pixel in a uth row and a vth column is denoted as $R_{u-v}$, where u is greater than or equal to 0 and less than or equal to i (0≤u≤i), and v is greater than or equal to 0 and less than or equal to j (0≤v≤j), and both u and v are integers. A row of pixels are pixels arranged in a line along the horizontal direction X in FIG. 4, and a column of pixels are pixels arranged in a line along the vertical direction Y in FIG. 4. For example, the first row of pixels is the pixel $R_{1-1}$ to the pixel $R_{1-j}$, and the first column of pixels is the pixel $R_{1-1}$ to the pixel $R_{i-1}$. For example, a pixel value of the pixel $R_{u-v}$ in the uth row and the vth column is denoted as $P_{u-v}$, and the plurality of pixel values in the first image data are arranged consecutively in the order of $(P_{1-1}, P_{1-2}, P_{1-3}, \ldots, P_{1-j}, P_{2-1}, P_{2-2}, \ldots, P_{2-j}, \ldots, P_{u-1}, \ldots, P_{u-v}, \ldots, P_{i-1}, P_{i-2}, \ldots, P_{i-j})$.

Figures 4A, 4B:
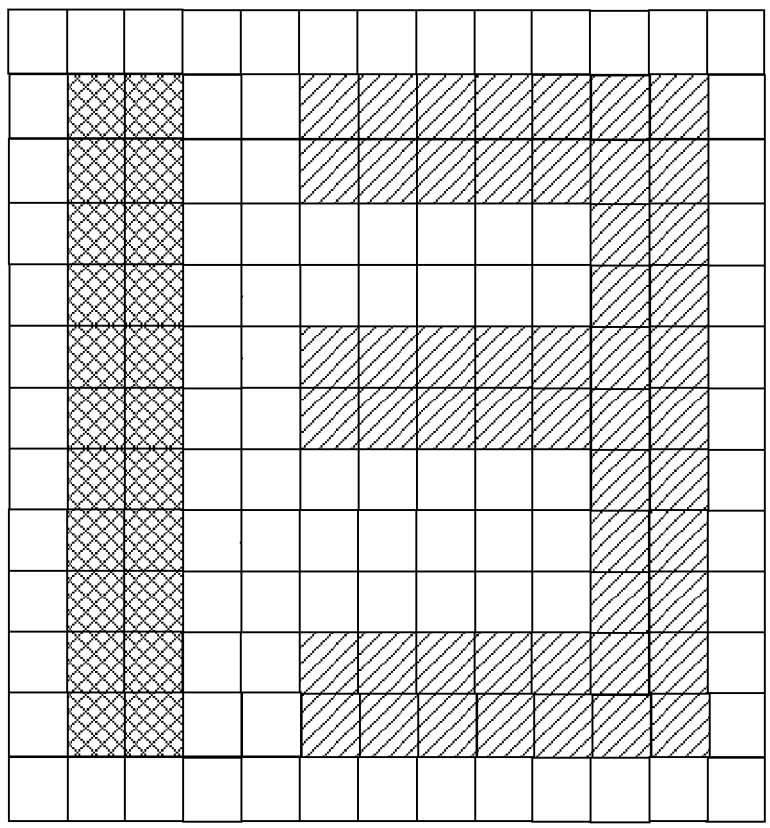
FIG. 4A is a distribution diagram of pixels, in accordance with some embodiments.
FIG. 4B is a distribution diagram of first image data, in accordance with some embodiments.

A pixel value may be used to characterize color information of each pixel, and the pixel value may be represented by bit(s). For a gradient-free image (picture), each pixel in the image can display few types of color, and each color has no gradient changes in brightness and chromaticity. The pixel value of each pixel may be represented by 2 to 4 bits. For example, in a case where each pixel can display two colors (e.g., the two colors displayed by each pixel are black and white), and each color can be represented by 1 bit, the pixel value of the black is 0, and the pixel value of the white is 1. For example, in a case where each pixel can display four colors (e.g., the four colors displayed by each pixel are black, white, red and purple), and each color can be represented by 2 bits, the pixel value of the black is 11, the pixel value of the white is 00, the pixel value of the red is 10, and the pixel value of the purple is 01. For example, as shown in FIG. 4B, the image displayed corresponding to the first image data presents a number "13". The pixel values of the pixels corresponding to "1" in the image are 10, and "1" is in red. The pixel values of the pixels corresponding to "3" in the image are 11, and "3" is in black. The pixel values of pixels corresponding to the rest of the image are 00, and the rest of the image is in white.

For example, from the pixel value $P_{1-1}$ of the pixel in the first row and first column to the pixel value $P_{i-j}$ of the pixel in the ith row and jth column, the first image data is divided into a plurality of data blocks, and each data block occupies one byte. For example, in a case where each pixel value is represented by one bit, each data block includes pixel values of eight pixels, for example, a first data block is $(P_{1-1}, P_{1-2}, P_{1-3}, P_{1-4}, P_{1-5}, P_{1-6}, P_{1-7}, P_{1-8})$, and a second data block is $(P_{1-9}, P_{1-10}, P_{1-11}, P_{1-12}, P_{1-13}, P_{1-14}, P_{1-15}, P_{1-16})$. For another example, in a case where each pixel value is represented by two bits, each data block includes the pixel values of four pixels, for example, a first data block is $(P_{1-1}, P_{1-2}, P_{1-3}, P_{1-4})$, and a second data block is $(P_{1-5}, P_{1-6}, P_{1-7}, P_{1-8})$.

In S20, at least one data set to be compressed in the first image data is compressed into a corresponding compression unit according to compression parameter(s), so as to obtain second image data including the compression unit.

The first image data includes at least one data set to be compressed. A data set to be compressed includes at least one data group. In a case where the data set to be compressed includes at least two data groups, the at least two data groups are arranged consecutively and identical. Each data group includes at least one data block. In a case where the data group includes at least two data blocks, the at least two data blocks are arranged consecutively.

For example, each data group may include two data blocks, and the two data blocks are arranged consecutively. For example, the first data block $(P_{1-1}, P_{1-2}, P_{1-3}, P_{1-4})$ and the second data block $(P_{1-5}, P_{1-6}, P_{1-7}, P_{1-8})$ constitute a data group. Alternatively, each data group may include one data block. For example, a first data group includes the first data block $(P_{1-1}, P_{1-2}, P_{1-3}, P_{1-4})$, a second data group includes the second data block $(P_{1-5}, P_{1-6}, P_{1-7}, P_{1-8})$, and the first data group and the second data group are arranged consecutively. In a case where the first data group and the second data group are identical, a data set to be compressed including the first data group and the second data group can be obtained. In a case where the first data group and the second data group are different, a data set to be compressed including the first data group and another data set to be compressed including the second data group can be obtained.

The compression parameter(s) include a first length. The first length is configured to characterize the number of data block(s) in a data group. The compression unit includes one data group in the data set to be compressed and a second length. The second length is configured to characterize the number of data group(s) in the data set to be compressed.

For example, the first length may represent the number of byte(s) occupied by the data block(s) in the data group. For example, the first length may represent the amount of storage space (i.e., the number of byte(s)). In a case where the first length is 2 bytes, the data block(s), characterized by the first length, in the data group occupy 2 bytes. That is, the number of the data block(s) is 2. Alternatively, the first length may represent a number. For example, the value of the first length is 2, in this case, the number of the data block(s), characterized by the first length, in the data group is 2, and 2 data blocks occupy 2 bytes. The second length may characterize the number of repetitions of the data group in the data set to be compressed. For example, the value of the second length is 1, and the value 1 can be represented as 00000001, which characterizes that the data group in the data set to be compressed is repeated once, that is, there are two data groups in the data set to be compressed. Based on this, in a case where the number of repetitions of the data group in the data set to be compressed is no more than 255, the second length occupies 1 byte; and in a case where the number of repetitions of the data group in the data set to be compressed is in the range of 256 to 511, the second length occupies 2 bytes. Alternatively, the second length may represent the number of data group(s) in the data set to be compressed. For example, the value of the second length is 1, which indicates that there is one data group in the data set to be compressed. Based on this, in a case where the number of data group(s) in the data set to be compressed is no more than 255, the second length occupies 1 byte; and in a case where the number of data group(s) in the data set to be compressed is in a range of 256 to 511, the second length occupies 2 bytes.

Figure 5:
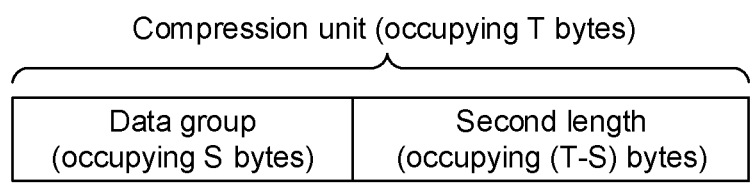
FIG. 5 is a structural diagram of a compression unit, in accordance with some embodiments.
Figure 6:
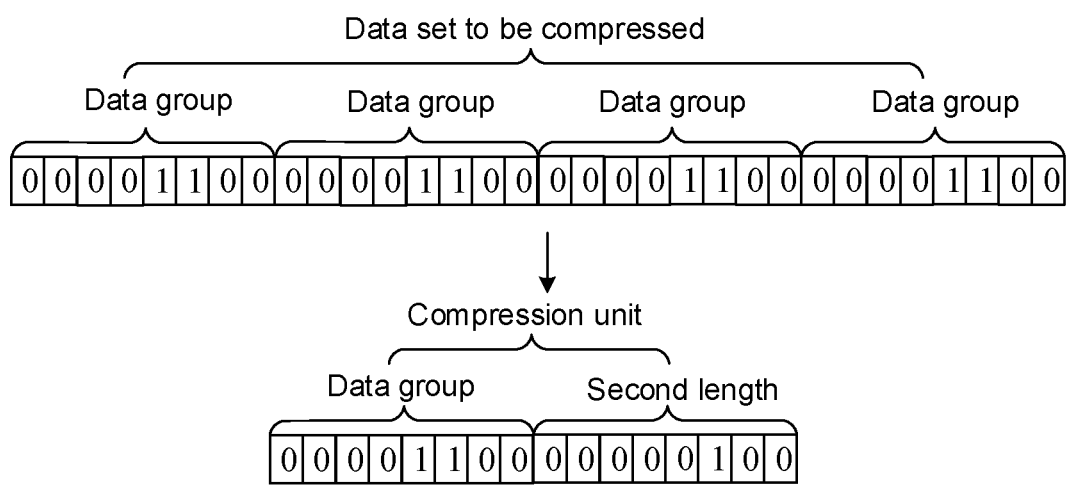
FIG. 6 is a process diagram of a data processing method, in accordance with some embodiments.

For example, storage space occupied by the compression unit is a sum of storage space occupied by one data group and storage space occupied by the second length. For example, as shown in FIG. 5, one compression unit occupies T bytes, one data group therein occupies S bytes, and the second length occupies (T-S) bytes, where S is a positive integer, and T is a positive integer greater than S. For example, as shown in FIG. 6, the data set to be compressed includes four data groups, each data group includes a data block (00001100), one data group included in the compression unit is any one of the four data groups, and the second length may be 4 (i.e., 00000100). The storage space occupied by the data group is 1 byte, and the storage space occupied by the second length is 1 byte. In this case, the storage space occupied by the compression unit is the sum of the storage space occupied by one data group and the storage space occupied by the second length, which is 2 bytes. In this case, the four data groups occupy 4 bytes, while the compression unit occupies 2 bytes. The amount of data of the compression unit is smaller than the amount of data of the data set to be compressed. Therefore, the first image data is processed in the embodiments of the present disclosure, which may reduce the amount of data and the storage space, thereby reducing the amount of data and the storage space of the second image data including the compression unit. In this way, in the process of data transmission, the transmission time may be shortened, the amount of data transmitted may be reduced, and the data transmission efficiency may be improved.

Thus, in the data processing method provided by the embodiments of the present disclosure, the first image data is acquired. The first image data includes the plurality of pixel values arranged consecutively. The plurality of pixel values are divided into the plurality of data blocks according to the arranging order of the pixel values, and each data block occupies one byte and includes at least one pixel value. At least one data set to be compressed in the first image data is compressed into the corresponding compression unit according to the compression parameter(s), so as to obtain second image data including the compression unit. The data set to be compressed includes at least one data group. In a case where the data set to be compressed includes at least two data groups, the at least two data groups are consecutively arranged and identical. Each data group includes at least one data block. In a case where the data group includes at least two data blocks, the at least two data blocks are arranged consecutively. The compression parameter(s) include the first length. The first length is configured to characterize the number of data block(s) in the data group. The compression unit includes one data group in the data set to be compressed and the second length. The second length is configured to characterize the number of data group(s) in the data set to be compressed. Based on this, the first image data is compressed in the embodiments of the present disclosure, the amount of data of the compression unit generated thereby is smaller than the amount of data of the corresponding data set to be compressed, and the amount of data of the obtained second image data including the compression unit is also smaller than the amount of data of the first image data. Therefore, compared with a case where the first image data is directly transmitted without being compressed, the electronic device compresses the first image data into the second image data and then transmits the second image data, which may reduce the amount of data transmitted, shorten the transmission time of data, reduce the pressure of data transmission between electronic devices, reduce the power consumption, and is applicable to an electronic device (e.g., EPD) that adopt a low performance processor. In addition, storage resources required by the electronic device to store the second image data and data processing resources required by the electronic device in the process of compressing the first image data to obtain the second image data may be reduced, which may save the cost of processing image data by the electronic device.

For example, for the gradient-free image, a different pixel value is inserted after every at least two identical pixel values, that is, a pixel of a different color is inserted after every at least two pixels with an identical color, so that the image displayed can have a gray scale in a visual sense. The inserted pixel of the different color may be referred to as a color point. For example, there is a different pixel value after every two identical pixel values, that is, there is a pixel of a different color after every two pixels with an identical color, so that the image displayed can have the gray scale in the visual sense.

For example, the pixel value of each pixel can be represented by two bits. The pixel value of black is 11, and the pixel value of white is 00. There is a pixel value of black after every two pixel values of white. That is, there is a black pixel after every two white pixels. In this case, the first image data is 000011000011000011000011000011 00 . . . , each data group includes three data blocks, and the three data blocks included in each data group are 00001100, 00110000, and 11000011 respectively. The first image data is presented as a cycle of the three data blocks (i.e., three bytes) as a whole, and the first length may occupy 3 bytes. For a case where the pixel can display two colors of black and white, the image displayed may visually appear gray, so that the image displayed has a gray scale.

For example, the data blocks in the first image data have a certain regularity. For example, the data set to be compressed in the first image data includes a plurality of data blocks A that are consecutive and identical. In this case, data in the data set to be compressed repeats in a manner of single-byte, and one data group may include one data block A. For example, the data set to be compressed in the first image data includes three kinds of data blocks A, B and C that are arranged in sequence, that is, the data blocks A, B and C are arranged repeatedly as a whole. In this case, data in the data set to be compressed repeats in a manner of multi-byte, and one data group may include three data blocks, which are the data blocks A, B, and C.

It will be noted that, the compression parameter(s) may be preset according to actual situations of the electronic device, for example, according to the type of image data received or displayed by the electronic device in actual use. For example, in a case where the image data received by the electronic device is mostly non-gradient image data, the displayed image corresponding to the non-gradient image data is mainly a plurality of pure color blocks, and the number of data blocks in the data group characterized by the first length in the compression parameter(s) may be one.

For example, the image displayed by the electronic device includes at least one pure color block, and one pure color block corresponds to a plurality of data groups which are identical and arranged consecutively. Therefore, the first image data has at least two data groups which are identical and arranged consecutively. For example, a compression parameter can be determined according to the size of the color block (i.e., the number of data groups which are identical and arranged consecutively). For example, the color block corresponding to the data set to be compressed, in which the number of data groups that are identical and arranged consecutively is the largest, can be regarded as the biggest color block. The first length can be determined according to the number of data blocks in a data group corresponding to the biggest color block. For example, the number of the data blocks in the data group corresponding to the biggest color block is 3, then the first length may occupy 3 bytes. Moreover, the second length may be determined according to the largest number of identical data groups. For example, the largest number of identical data groups is 250, then the second length may occupy 1 byte. In addition, the amount of the storage space of the compression unit may be determined according to the first length and the second length. For example, the amount of the storage space of the compression unit may be the sum of the storage space occupied by the first length and the storage space occupied by the second length. For example, the first length occupies 3 bytes, the second length occupies 1 byte, then the storage space of the compression unit is 4 bytes.

Figure 7:
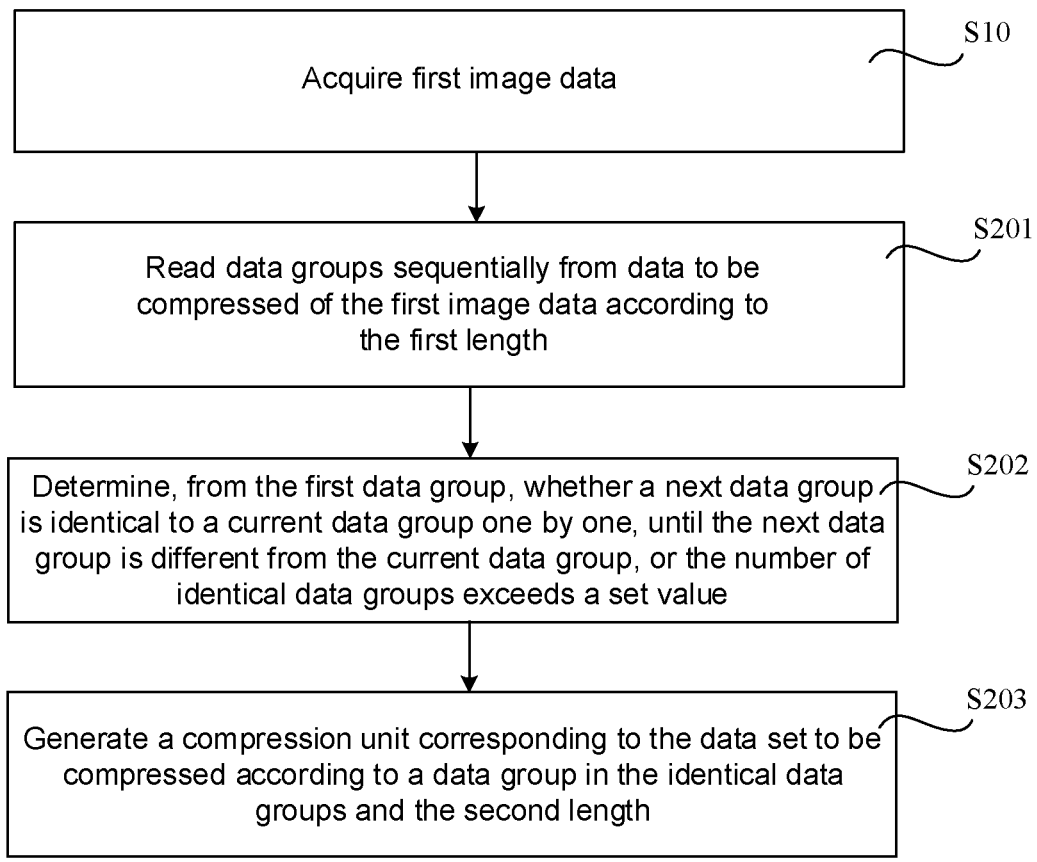
FIG. 7 is a flow diagram of another data processing method, in accordance with some embodiments.

For example, as shown in FIG. 7, compressing the at least one data set to be compressed in the first image data into the corresponding compression unit according to the compression parameter(s) includes the following steps (S201 to S203).

In S201, data groups are read sequentially from data to be compressed of the first image data according to the first length.

For example, in the data to be compressed of the first image data, the pixel values that are arranged consecutively are 00, 10, 11, 01, 00, 10, 11, 01, 00, 00, 11, 11, 00, 00, 11, 11, 00, 00, 11, 11, 00, 00, 11, 11. In this case, the data to be compressed has six data blocks, which are a first data block 00101101, a second data block 00101101, a third data block 00001111, a fourth data block 00001111, a fifth data block 00001111 and a sixth data block 00001111, and each data block includes four pixel values. In a case where the number of data blocks in the data group which is characterized by the first length is 2, that is, in a case where the first length occupies 2 bytes, the data is read from the first pixel value 00 with a step length of 2 bytes according to the first length, so as to obtain three data groups, which are: the first data group including the first data block and the second data block, the first data group being 0010110100101101; the second data group including the third data block and the fourth data block, the second data group being 0000111100001111; and the third data group including the fifth data block and the sixth data block, the third data group being 0000111100001111.

Figure 8:
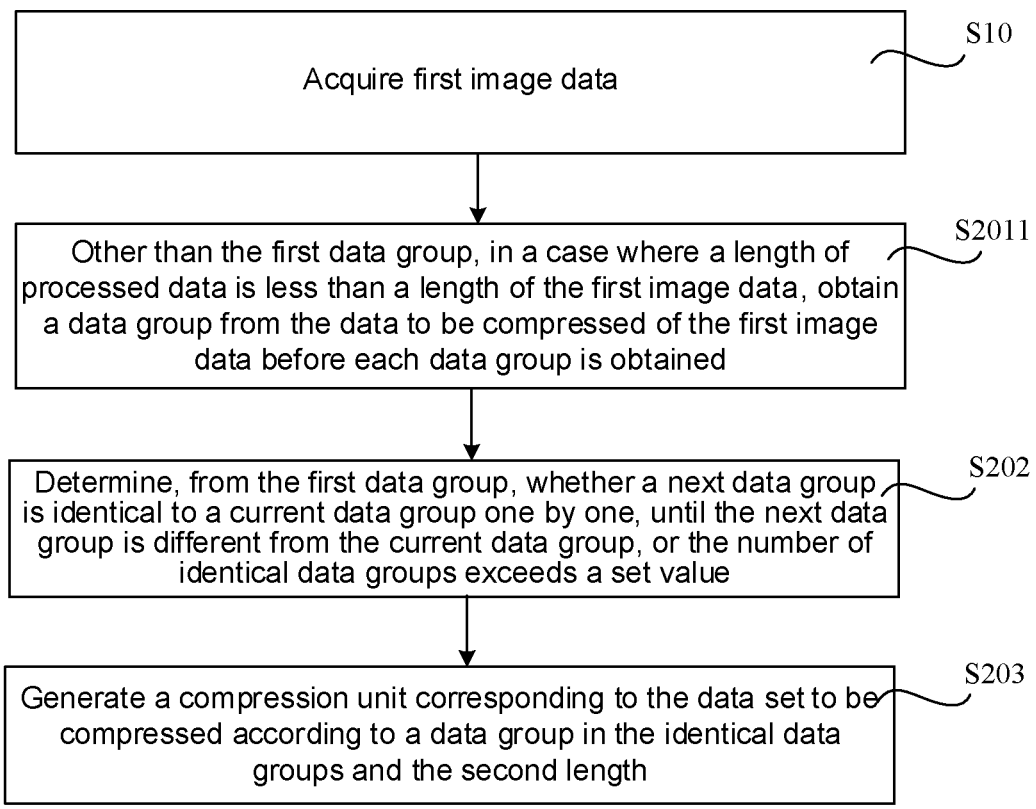
FIG. 8 is a flow diagram of yet another data processing method, in accordance with some embodiments.

For example, as shown in FIG. 8, reading the data groups sequentially from the data to be compressed of the first image data according to the first length in S201 includes the following step (S2011).

In S2011, other than the first data group, in a case where a length of processed data is less than a length of the first image data, a data group is obtained from the data to be compressed of the first image data before each data group is obtained.

It will be noted that, the processed data refers to data that has been compressed to generate a compression unit.

For example, the length of the first image data occupies 6 bytes, and the data to be compressed of the first image data is 00, 10, 11, 01, 00, 10, 11, 01, 00, 00, 11, 11, 00, 00, 11, 11, 00, 00, 11, 11, 00, 00, 11, 11. In a case where each data group includes 2 data blocks, the first data group is 0010110100101101. Before the second data group is obtained, the length of the processed data is compared with the length of the first image data. In this case, the processed data (i.e., the data that has been read) is the first data group, and the length thereof occupies 2 bytes, which is less than the length of the first image data. As a result, the second data group 0000111100001111 can be obtained. Before the third data group is obtained, the length of the processed data is compared with the length of the first image data. In this case, the processed data is the first data group and the second data group, and the length thereof occupies 4 bytes, which is less than the length of the first image data. As a result, the third data group 0000111100001111 can be obtained. Before the fourth data group is obtained, the length of the processed data is compared with the length of the first image data. In this case, the processed data is the first data group, the second data group and the third data group, and the length thereof occupies 6 bytes, which is equal to the length of the first image data. As a result, a fourth data group cannot be obtained, and the first image data has no data to be processed, so that the reading process of the first image data ends.

In S202, whether a next data group is identical to a current data group is determined from the first data group one by one, until the next data group is different from the current data group, or the number of identical data groups exceeds a set value. The identical data groups constitute a data set to be compressed.

In S203, a compression unit corresponding to the data set to be compressed is generated according to a data group in the identical data groups and the second length.

It will be noted that, in a case where the next data group is different from the current data group, since the current data group is the identical to a previous data group, a compression unit can be generated according to the current data group and the previous data group. That is, the current data group and the previous data group can be regarded as the processed data. In this case, the next data group can be regarded as unprocessed data (i.e., data to be compressed), and the next data group is updated to be the current data group which is then compared with the next data group. If they are different, a compression unit will be generated according to the updated current data group.

For example, in a case where the first data group is read as 0010110100101101 and the second data group is read as 0000111100001111, the second data group is compared with the first data group to determine whether they are identical. Since the second data group is different from the first data group, a first data set to be compressed includes the first data group, a data group included in a first compression unit generated is the first data group, and the number of data groups characterized by the second length included in the first compression unit is 1 (e.g., the value 1 can be represented as 00000001). In a case where the third data group is read as 0000111100001111, the third data group is compared with the second data group to determine whether they are identical. Since the third data group is identical to the second data group, reading of data group can proceed. In a case where the fourth data group is read as 0010110100101101, since the fourth data group is different from the third data group, a second data set to be compressed can be obtained. The second data set to be compressed includes the second data group and the third data group, a data group included in the second compression unit generated may either be the third data group or the second data group, and the number of data groups characterized by the second length included in the second compression unit is 2 (e.g., the value 2 may be represented as 00000010). The second length may occupy the storage space of 1 byte. For example, referring to FIG. 5, the second compression unit is (0000111100001111 00000010), and occupies 3 bytes. The first 16 bits thereof (the 1st byte to the 2nd byte) represent a data group occupying 2 bytes, and the last 8 bits (the 3rd byte) represent a second length occupying 1 byte. Compared with the second data set to be compressed, the storage space occupied by the second compression unit is smaller, which may reduce the amount of data.

It will be noted that, the above-mentioned set value indicates the largest number of identical data groups in a generated compression unit corresponding to the data set to be compressed. For example, in a case where the set value is 255, the largest number of identical data groups corresponding to a generated compression unit corresponding to the data set to be compressed may be 255. In this case, the second length is 255 (i.e., 11111111), that is, the storage space occupied by the second length is 1 byte.

For example, the data to be compressed in the first data group has three data sets to be compressed, the number of first data groups A in the first data set to be compressed is 511, the number of second data groups B in the second data set to be compressed is 255, and the number of third data groups C in the third data set to be compressed is 255. A first data group A, a second data group B and a third data group C all occupy one byte. In this case, the compression units obtained by compressing the first image data have the same storage space, that is, the storage space of the data group in each compression unit is the same, and the storage space of the second length in each compression unit is the same. Therefore, each compression unit may occupy 3 bytes. The length of the first compression unit obtained according to the first data set to be compressed may occupy 3 bytes (the first data group A occupies 1 byte, and the second length occupies 2 bytes), the length of the second compression unit obtained according to the second data set to be compressed may occupy 3 bytes (the second data group B occupies 1 byte, and the second length occupies 2 bytes), and the length of the third compression unit obtained according to the third data set to be compressed may occupy 3 bytes (the third data group C occupies 1 byte, and the second length occupies 2 bytes). Therefore, the length of the second image data obtained occupies 9 bytes. In this case, the number of the first data groups A is greater than the number of the second data groups B, and is also greater than the number of the third data groups C. If the set value is 255, the number of the first data groups A exceeds the set value, thus two first compression units can be obtained in the process of compressing the first data set to be compressed, the number of first data groups A in one first compression unit is 255, and the number of first data groups A in another first compression unit is 255. In this way, the two compression units each occupy 2 bytes (the first data group A occupies 1 byte, and the second length occupies 1 byte). Accordingly, the length of the second compression unit may occupy 2 bytes (the second data group B occupies 1 byte, and the second length occupies 1 byte), and the length of the third compression unit may occupy 2 bytes (the third data group C occupies 1 byte, and the second length occupies 1 byte). In this case, the length of the second image data obtained occupies 8 bytes.

Figure 9:
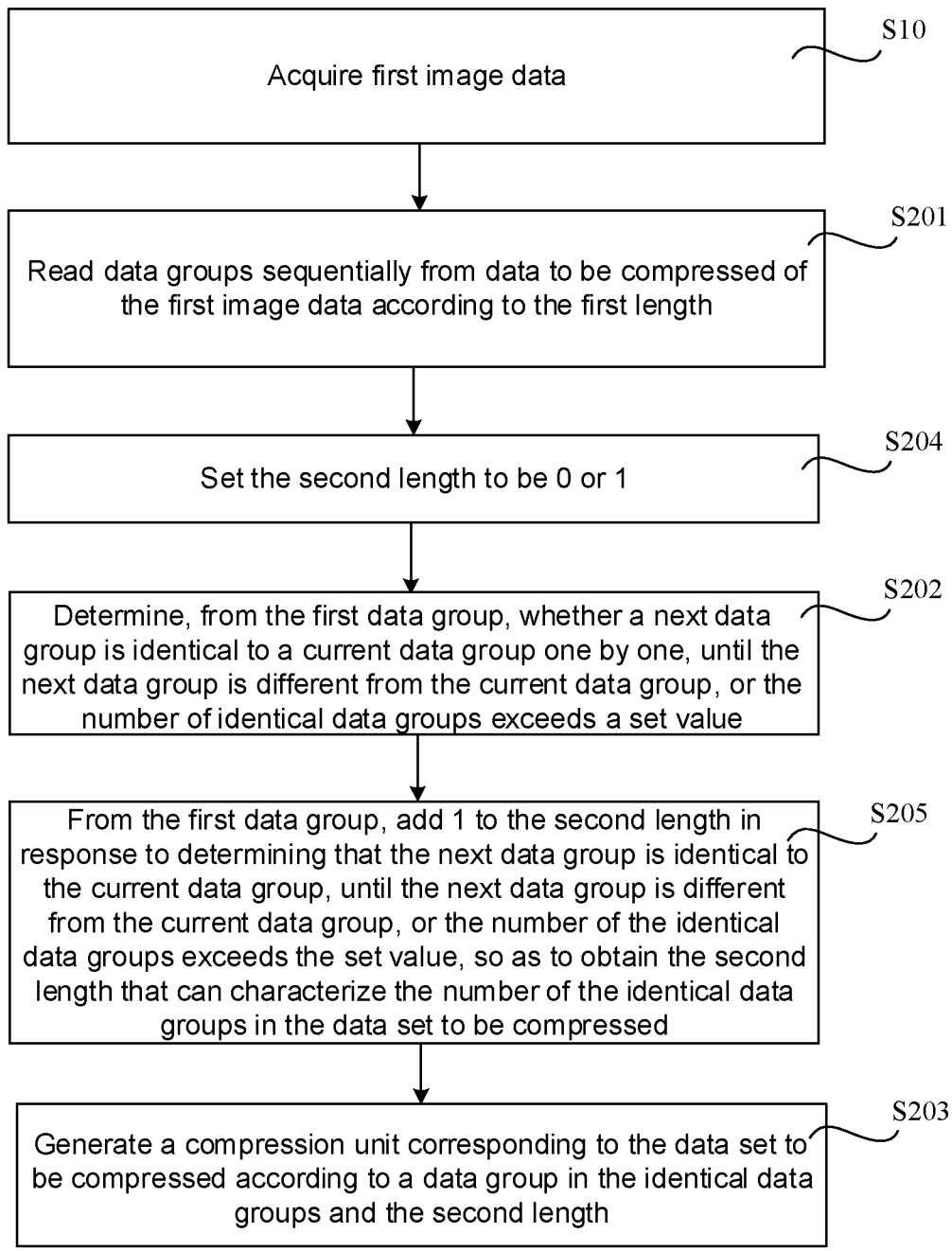
FIG. 9 is a flow diagram of yet another data processing method, in accordance with some embodiments.

In some embodiments, as shown in FIG. 9, compressing the at least one data set to be compressed in the first image data into the corresponding compression unit according to the compression parameter(s) further includes the following steps S204 and S205.

In S204, the second length is set to be 0 or 1. In this case, the storage space of the second length can be initialized, thereby avoiding an error of an initial value of the second length and improving the accuracy of the second length.

In S205, 1 is added to the second length from the first data group in response to determining that the next data group is identical to the current data group, until the next data group is different from the current data group, or the number of the identical data groups exceeds the set value, so as to obtain the second length that can characterize the number of the identical data groups in the data set to be compressed.

For example, in a case where the second length is set to be 0, the initial value of the second length can be 0000000. The second data group is compared with the first data group, and if the second data group is identical to the first data group, 1 is added to the second length. That is, the value of the second length is 1 (e.g., the second length can be represented as 00000001). The third data group is compared with the second data group, and if the third data group is identical to the second data group, 1 is further added to the second length. That is, the value of the second length is 2 (e.g., the second length can be represented as 00000010). The fourth data group is compared with the third data group, and if the fourth data group is different from the third data group, the second length stops adding 1 thereto. In this case, the value of the second length is 2, which can characterize that the number of the identical data groups is 3, namely, the first data group, the second data group and the third data group. Alternatively, in a case where the set value is 255, if the next data group is identical to the current data group, 1 is added to the second length, until the value of the second length increases to 255, so that the value of the second length obtained is 255 (e.g., the second length can be represented as 11111111). In this case, the second length can also characterize repetition times of the data group.

For example, in a case where the second length is set to be 1, the initial value of the second length can be 0000001. The second data group is compared with the first data group, and if the second data group is identical to the first data group, 1 is added to the second length. That is, the value of the second length is 2 (e.g., the second length can be represented as 00000010). The third data group is compared with the second data group, and if the third data group is identical to the second data group, 1 is further added to the second length. That is, the value of the second length is 3 (e.g., the second length can be represented as 00000011). The fourth data group is compared with the third data group, and if the fourth data group is different from the third data group, the second length stops adding 1 thereto. In this case, the value of the second length is 3, which can characterize that the number of the identical data groups is 3, namely, the first data group, the second data group and the third data group. Alternatively, in a case where the set value is 255, if the next data group is identical to the current data group, 1 is added to the second length, until the value of the second length increases to 255, so that the value of the second length obtained is 255 (e.g., the second length can be represented as 11111111).

In some embodiments, the compression parameter(s) further include a third length. The third length is configured to characterize the amount of the storage space of the compression unit. The compression unit includes the data group and the second length. Therefore, the amount of the storage space characterized by the third length is greater than the length of the data group, that is, greater than the number of data blocks characterized by the first length. For example, the first length characterizes that the number of data blocks in a data group is Q, and Q is a positive integer, then the first length is Q bytes, and the number of bytes of the third length is greater than or equal to (Q+1) bytes.

It will be noted that, before the electronic device performs data processing, a certain storage space may be reserved for writing the compressed data. For example, referring to FIG. 5, the third length is T, and the first length is S. In this case, T bytes of storage space can be reserved. When the first image data is compressed, one data group is written into S bytes of storage space in the T bytes of storage space, and (T-S) bytes of storage space is initialized (i.e., the (T-S) bytes of storage space is set to be 0 or 1), and the second length is written into the (T-S) bytes of storage space in the T bytes of storage space.

Figure 10:
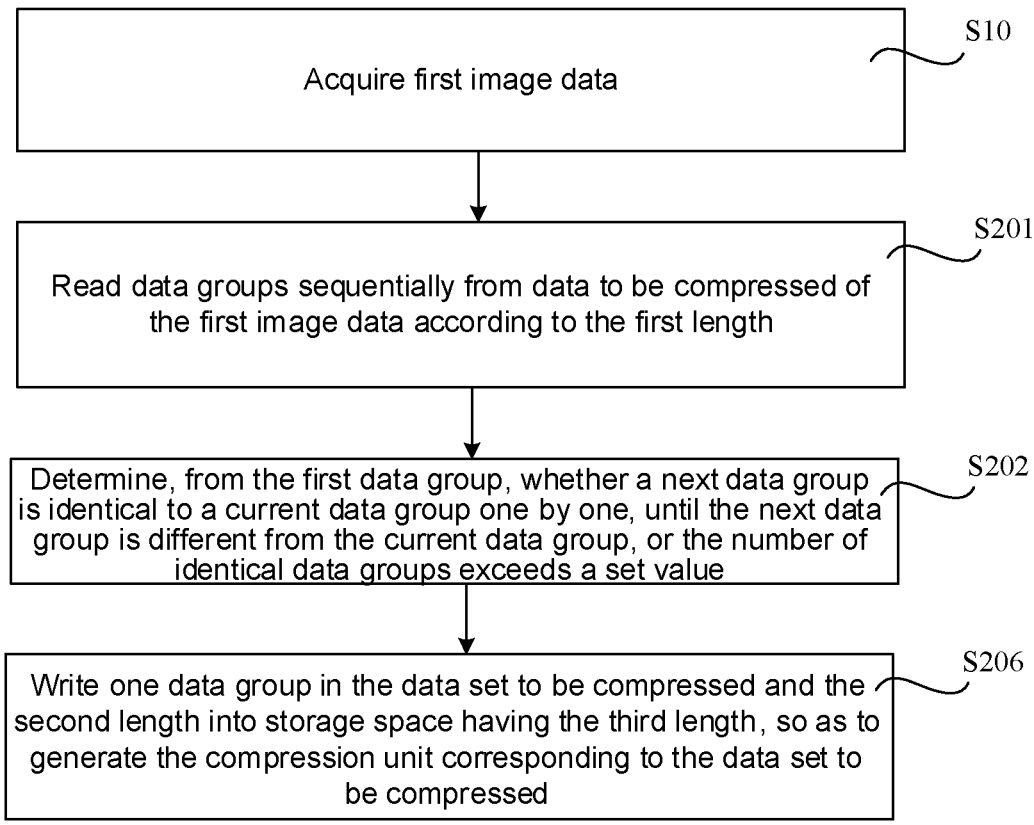
FIG. 10 is a flow diagram of yet another data processing method, in accordance with some embodiments.

For example, as shown in FIG. 10, generating the compression unit corresponding to the data set to be compressed according to the data group in the identical data groups and the second length in S203 includes the following step (S206).

In S206, one data group in the data set to be compressed and the second length are written into storage space having the third length, so as to generate the compression unit corresponding to the data set to be compressed.

For example, a storage device in the electronic device (the first electronic device) may have the storage space with a third length. One data group is written into the storage space with the third length, and the second length is written into the storage space with the third length when the second length is obtained, so that the compression unit is obtained.

In some embodiments, the data group included in the compression unit is the first data group in the data set to be compressed. For example, when determining the first data group in the data to be compressed, the first data group is written into the storage space with the third length, and a value of the remaining storage space in the storage space with the third length is set to be 0 or 1. Starting from the first data group, if the next data group is identical to the current data group in the data to be compressed, 1 is added to the value of the remaining storage space, until the next data group is different from the current data group. In this case, the accumulated value of the remaining storage space is the second length, which characterizes the number of the identical data groups. For example, the second length can be written into the remaining storage space in parallel when comparing whether two adjacent data groups are identical.

For example, in a case where the initial value of the remaining storage space is 0 (e.g., if the remaining storage space is 1 byte, the initial value of the remaining storage space is 00000000), the second data group is compared with the first data group, and if the second data group is identical to the first data group, 1 is added to the value of the remaining storage space. That is, the value of the second length is 1 (e.g., the value of the remaining storage space is 00000001). The third data group is compared with the second data group, and if the third data group is identical to the second data group, 1 is added to the value of the remaining storage space. That is, the value of the second length is 2 (e.g., the value of the remaining storage space is 00000010). The fourth data group is compared with the third data group, and if the fourth data group is different from the third data group, the value of the remaining storage space stops adding 1 thereto. In this case, the value of the remaining storage space is 2, and the value of the second length is 2, which can characterize that the number of the identical data groups is 3, namely, the first data group, the second data group and the third data group. In this case, the second length may also characterize the repetition times of the data group.

For example, in a case where the initial value of the remaining storage space is 1 (e.g., if the remaining storage space is 1 byte, the initial value of the remaining storage space is 00000001), the second data group is compared with the first data group, and if the second data group is identical to the first data group, 1 is added to the value of the remaining storage space. That is, the value of the second length is 2 (e.g., the value of the remaining storage space is 00000010). The third data group is compared with the second data group, and if the third data group is identical to the second data group, 1 is added to the value of the remaining storage space. That is, the value of the second length is 3 (e.g., the value of the remaining storage space is 00000011). The fourth data group is compared with the third data group, and if the fourth data group is different from the third data group, the value of the remaining storage space stops adding 1 thereto. In this case, the value of the remaining storage space is 3, and the value of the second length is 3, which can characterize that the number of the identical data groups is 3, namely, the first data group, the second data group and the third data group.

In some embodiments, there are a plurality groups of compression parameters, and the plurality groups of compression parameters are not exactly the same. For example, in one group of compression parameter(s), the first length N is 1, and the third length L is 2; while in another group of compression parameter(s) the first length N is 2, and the third length L is 3. The two groups of compression parameters are not the same.

Figure 11:
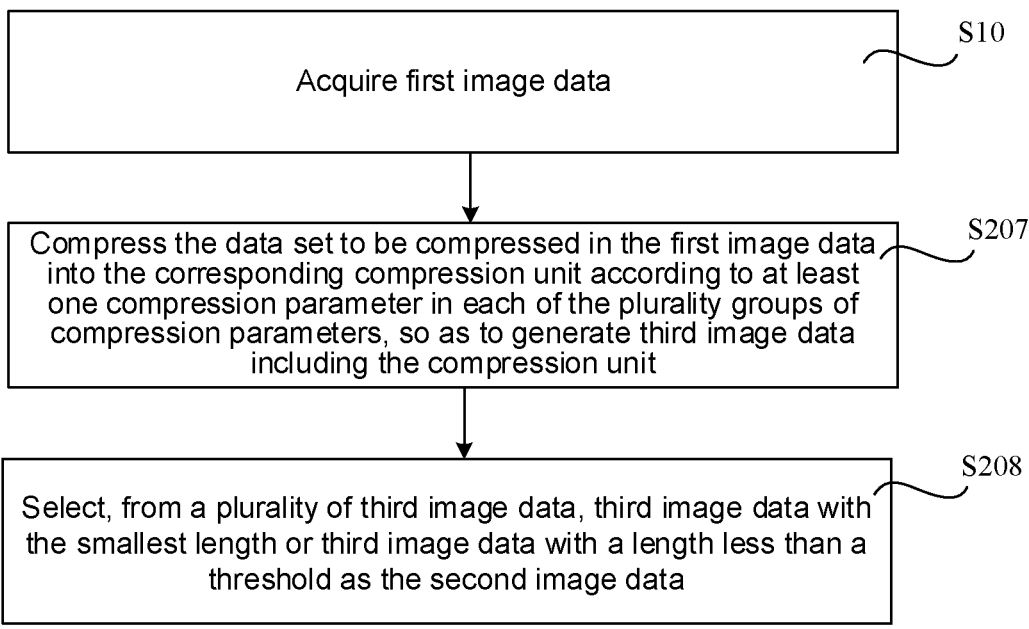
FIG. 11 is a flow diagram of yet another data processing method, in accordance with some embodiments.

For example, as shown in FIG. 11, compressing the at least one data set to be compressed in the first image data into the corresponding compression unit according to the compression parameter(s), so as to obtain the second image data including the compression unit, includes the following steps (S207 and S208).

In S207, the data set to be compressed in the first image data is compressed into the corresponding compression unit according to at least one compression parameter in each of the plurality groups of compression parameters, so as to generate third image data including the compression unit.

In S208, third image data with the smallest length, or third image data with a length less than a threshold is selected from a plurality of third image data as the second image data.

For example, the compression parameter(s) include the first length. The data set to be compressed in the first image data is compressed into the corresponding compression unit according to each group of compression parameter of the plurality groups of compression parameters, that is, according to the first length in each group of compression parameter, so as to generate the third image data including the compression unit. For example, in a case where the number of the plurality groups of compression parameters is three, there are also three first lengths, which are a first first length $N_1$ in a first group of compression parameter, a second first length $N_2$ in a second group of compression parameter and a third first length $N_3$ in a third group of compression parameter. In this case, the data set to be compressed in the first image data is compressed into a corresponding compression unit (a first compression unit) according to the first first length $N_1$, so as to generate a first third image data including the first compression unit, and the length of one data group in the first compression unit is $N_1$ bytes. The data set to be compressed in the first image data is compressed into a corresponding compression unit (a second compression unit) according to the second first length $N_2$, so as to generate a second third image data including the second compression unit, and the length of one data group in the second compression unit is $N_2$ bytes. The data set to be compressed in the first image data is compressed into a corresponding compression unit (a third compression unit) according to the third first length $N_3$, so as to generate a third third image data including the third compression unit, and the length of one data group in the third compression unit is $N_3$ bytes.

For example, the compression parameter(s) include the first length and the third length. The data set to be compressed in the first image data is compressed into the corresponding compression unit according to each group of compression parameters of the plurality groups of compression parameters, that is, according to the first length and the third length in each group of compression parameters, so as to generate the third image data including the compression unit. For example, in a case where the number of the plurality groups of compression parameters is three, there are also three first lengths and three third lengths, which are, respectively, a first first length $N_1$ and a first third length $L_1$ in the first group of compression parameters, a second first length $N_2$ and a second third length $L_2$ in the second group of compression parameters and a third first length $N_3$ and a third third length $L_3$ in the third group of compression parameters. In this case, the data set to be compressed in the first image data is compressed into a corresponding compression unit (a first compression unit) according to the first first length $N_1$ and the first third length $L_1$, so as to generate a first third image data including the first compression unit. The length of one data group in the first compression unit is $N_1$ bytes, and the length of the first compression unit is $L_1$ bytes. The data set to be compressed in the first image data is compressed into a corresponding compression unit (a second compression unit) according to the second first length $N_2$ and the second third length $L_2$, so as to generate a second third image data including the second compression unit. The length of one data group in the second compression unit is $N_2$ bytes, and the length of the second compression unit is $L_2$ bytes. The data set to be compressed in the first image data is compressed into a corresponding compression unit (a third compression unit) according to the third first length $N_3$ and the third third length $L_3$, so as to generate a third third image data including the third compression unit. The length of one data group in the third compression unit is $N_3$ bytes, and the length of the third compression unit is $L_3$ bytes.

In this case, the lengths of the first third image data, the second third image data and the third third image are compared, and the third image data with the smallest length among the first third image data, the second third image data and the third third image data, such as the second third image data, is transmitted as the second image data. Alternatively, in the process of generating the first third image data, the second third image data and the third third image data, if the length of the first third image data is greater than the threshold, while the length of the second third image data is less than the threshold, the second third image data is transmitted as the second image data. In this way, the third third image data will not be generated.

For example, the threshold may be pre-configured in the electronic device, and the threshold may characterize the length of image data (e.g., the number of bytes of the image data). The first electronic device compresses the first image data into the second image data of which the length is within the range of the threshold, and the length of the second image data is much less than the length of the first image data. The first electronic device transmits the second image data to the second electronic device, and the second electronic device will not exceed the hashrate of the second electronic device in a process of decompressing the second image data.

It will be noted that, the plurality groups of compression parameters may be pre-configured in the electronic device (e.g., the first electronic device). For example, a plurality of first lengths N may be pre-configured, and in a case where the compression parameter(s) further include the third length, a plurality of third lengths L may also be pre-configured.

Figure 12:
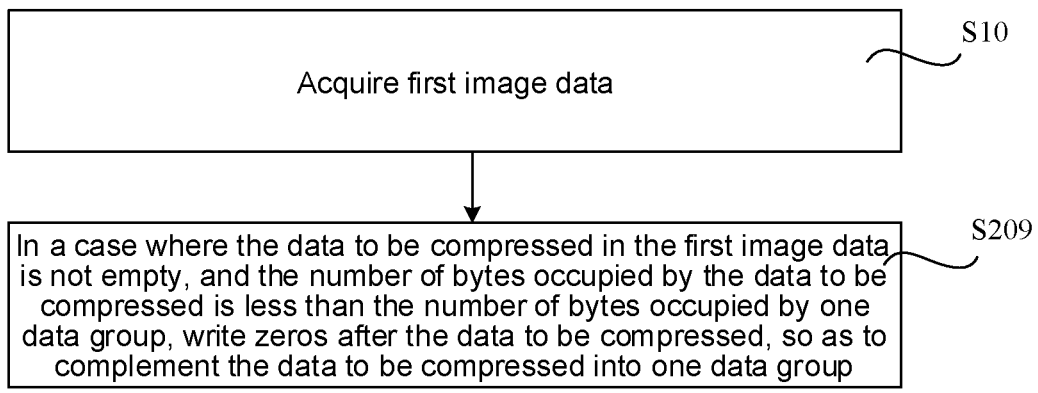
FIG. 12 is a flow diagram of yet another data processing method, in accordance with some embodiments.

For example, as shown in FIG. 12, compressing the at least one data set to be compressed in the first image data into the corresponding compression unit according to the compression parameter(s) includes the following step (S209).

In S209, in a case where the data to be compressed of the first image data is not empty, and the number of bytes occupied by the data to be compressed is less than the number of bytes occupied by one data group, zeros are written after the data to be compressed, so as to complement the data to be compressed into one data group.

For example, in a case where the number of the data blocks in each data group is 3 (i.e., the data group occupies 3 bytes and the first length can be 3 bytes), if the data to be compressed is a data block A which is located at the end of the first image data, the data to be compressed is 1 byte, which is less than 3 bytes. In this case, zeros can be written after the data block A at the end of the data to be compressed. That is, two data blocks B and C with data of zeros (e.g., the data block B and the data block C are both 00000000) can be written as a supplement. In this way, the data to be compressed can be read according to the first length, and a data group including 3 data blocks can be obtained, and the 3 data blocks in the data group are the data block A, the data block B and the data block C, respectively. In this case, the data group obtained by writing zeros is compared with the previous data group, so as to obtain the compression unit(s).

In some embodiments, the second image data further includes the compression parameter(s). For example, the compression parameter(s) can be written before the compression unit(s) in the second image data. Alternatively, the compression parameter(s) can be written after the compression unit(s) in the second image data. A position of the compression parameter(s) in the second image data can be set according to actual situations, which is not limited here. For example, in a case where the compression parameter(s) are written before the compression unit(s) in the second image data, the first length and the third length may be written before the compression unit(s) in the second image data, and the sequence may be the third length, the first length and the compression unit(s). For example, the compression parameter(s) are located in the file header of the second image data.

For example, in a case where there are the plurality groups of compression parameters, the compression parameter(s) included in the second image data are the compression parameter(s) used when obtaining the compression unit in the second image data. For example, the above-mentioned compression parameters used when obtaining the second third image data are the compression parameters included in the second image data.

For example, the second image data may further include the amount of data of the first image data (e.g., the amount of the storage space occupied by the first image data), the amount of data of all compression units as a whole (e.g., the amount of the storage space occupied by all compression units as a whole, or the total number of compression units), the arranging order of the plurality of pixel values in the first image data, and the like. For example, in the file header of the second image data, the 1st to 10th bytes may be the amount of data of the first image data, the 11th to 20th bytes may store the data of all compression units as a whole, the 21st byte may store the third length, the 22nd byte may store the first length, the 23rd to 26th bytes may store reserved information (e.g., picture name), the 27th to 31st bytes may store the arranging order of the plurality of pixel values in the first image data (e.g., scanning row by row). The amount of data of the first image data is information carried by the first image data itself during the transmission process, the amount of data of all compression units as a whole is information generated during the process of compressing the first image data, and the first length and the third length may be pre-selected or preset information.

In some embodiments, the number of the data blocks included in a data group is any of 1 to 4. For example, the amount of the storage space of one data group is any of 1 to 4 bytes. For example, the first length N may represent a length of any of 1 to 4 bytes. For example, in a case where the number of data groups in the data set to be compressed is less than or equal to 255 (or the repetition times of the data groups is less than or equal to 255), the storage space of the second length M may be 1 byte, and in this case, the storage space of the third length L can be (N+1) bytes. In a case where the number of data groups in the data set to be compressed is greater than 255, and is less than or equal to 511 (or the repetition times of the data groups is greater than 255, and is less than or equal to 511), the storage space of the second length M may be 2 bytes, and in this case, the storage space of the third length L may be (N+2) bytes. It will be understood that, the difference between the storage space of the third length and the storage space of the first length is greater than or equal to 1 byte.

For example, in a case where the compression parameter(s) include the first length and the third length, the storage space of the second length is the difference between the storage space of the third length and the storage space of the first length. For example, referring to FIG. 5, the first length occupies S bytes and the third length occupies T bytes. In this case, the second length occupies (T-S) bytes. For example, in a case where the compression parameter(s) include the first length, the amount of the storage space occupied by the second length can be preset, so as to obtain the amount of the third length. For example, the first length occupies S bytes and the preset second length occupies 1 byte, so that the third length occupies (S+1) bytes.

In addition, in some embodiments, the data processing method further includes: sending the second image data to an electronic device. For example, the first electronic device transmits the second image data to the second electronic device.

Figure 13:
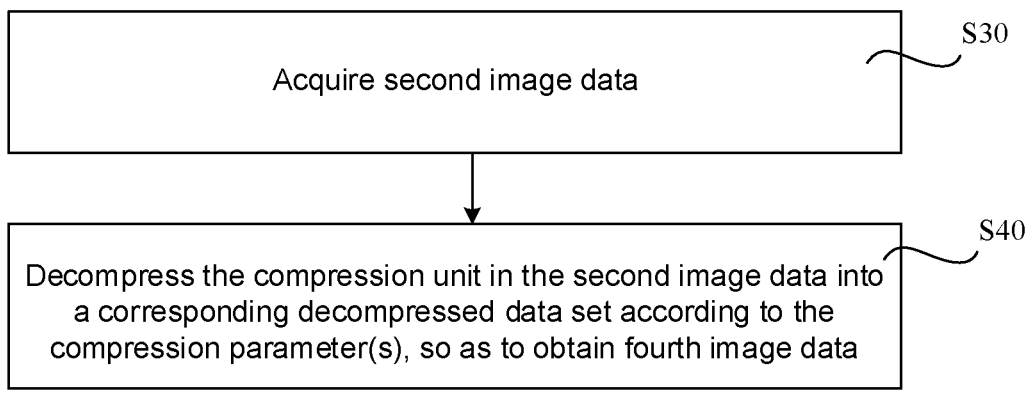
FIG. 13 is a flow diagram of yet another data processing method, in accordance with some embodiments.

Embodiments of the present disclosure provide a data processing method. The data processing method may be applied to the above electronic device 100, for example, to the second electronic device 100B. As shown in FIG. 13, the data processing method includes the following steps S30 and S40.

In S30, second image data is acquired. The second image data includes at least one compression unit, and the compression unit includes one data group and a second length.

In S40, the compression unit in the second image data is decompressed into a corresponding decompressed data set according to the compression parameter(s), so as to obtain fourth image data.

The compression parameter(s) include a first length, and the first length is configured to characterize the number of data block(s) in the data group. The second length is configured to characterize the number of data group(s) in the decompressed data set corresponding to the compression unit. The decompressed data set includes at least one data group. In a case where the decompressed data set includes at least two data groups, the at least two data groups are consecutively arranged. Each data group includes at least one data block. In a case where the data group includes at least two data blocks, the at least two data blocks are arranged consecutively. The fourth image data includes a plurality of data blocks that are arranged consecutively, and each data block includes a plurality of pixel values that are arranged consecutively.

It can be understood that, a first electronic device transmits a compression unit obtained by compressing a data set to be compressed to a second electronic device, then the second electronic device decompresses the compression unit to obtain a decompressed data set, and data in the decompressed data set corresponding to the compression unit and data in the data set to be compressed corresponding to the compression unit are identical. The fourth image data includes at least one decompressed data set.

It will be noted that, the compression parameter(s) used in the decompression process of image data is the same as the compression parameter(s) used in the compression process of the image data. The compression parameter(s) may be pre-configured in the electronic device (e.g., the second electronic device). The data after decompression (i.e., the fourth image data) and the data before compression (i.e., the first image data) should be identical.

For example, in a case where the compression unit includes one data group A and the second length is 3 (i.e., the number of data groups in the decompressed data set corresponding to the compression unit is 3), the decompressed data set is (A, A, A). Furthermore, in a case where the first length is 3 (i.e., the number of data blocks in the data group is 3), the data group A includes three data blocks ($A_1$, $A_2$, $A_3$), and the decompressed data set is ($A_1$, $A_2$, $A_3$, $A_1$, $A_2$, $A_3$, $A_1$, $A_2$, $A_3$), so that the fourth image data including six data blocks ($A_1$, $A_2$, $A_3$, $A_1$, $A_2$, $A_3$, $A_1$, $A_2$, $A_3$) is obtained. In this case, the data group A occupies 3 bytes, the second length occupies 1 byte, the compression unit occupies 4 bytes, the decompressed data set occupies 6 bytes, and the fourth image data occupies 6 bytes. In this way, the amount of data of the compression unit is relatively small, the hashrate of the electronic device occupied during the decompression process is relatively small, and the storage space occupied is also relatively small, which may reduce the cost and power consumption of the electronic device.

Thus, in the data processing method provided by the embodiments of the present disclosure, the second image data is acquired. The second image data includes compression unit(s), and the compression unit(s) each include one data group and the second length. The compression unit(s) in the second image data are decompressed into corresponding decompressed data set(s) according to the compression parameter(s), so as to obtain the fourth image data. The compression parameter(s) include the first length. In this case, since the amount of data of the compression unit is less than the amount of data of the decompressed data set corresponding to the compression unit, the electronic device occupies the relatively small hashrate and storage space during the process of decompressing the compression unit to obtain the fourth image data, so that the cost and power consumption of the electronic device may be reduced, and the efficiency of data processing can be improved. In addition, the data processing method provided by the embodiments of the present disclosure is simple in decompression, and can be applied to a low-end processor including, for example, a micro controller unit (MCU) and the like.

Figure 14:
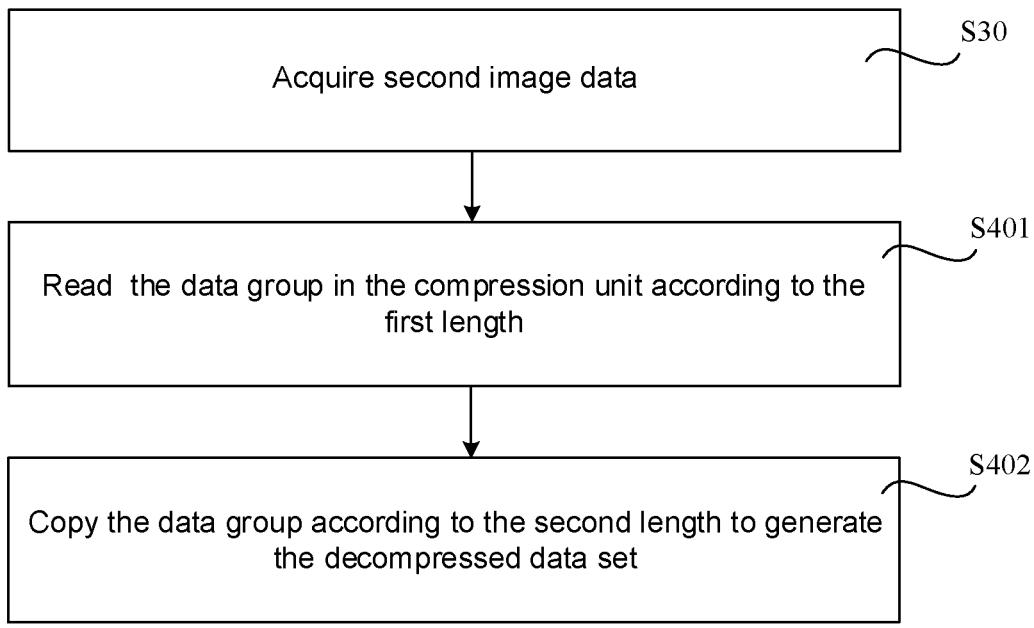
FIG. 14 is a flow diagram of yet another data processing method, in accordance with some embodiments.

For example, as shown in FIG. 14, decompressing the compression unit in the second image data into the corresponding decompressed data set according to the compression parameter(s) includes the following steps (S401 and S402).

In S401, the data group in the compression unit is read according to the first length.

For example, in a case where the first length is greater than 1, that is, in a case where the number of data block(s) in the data group is greater than 1, the data group occupies multiple bytes. The multiple bytes can be read at a time to obtain the data group in the compression unit, which may improve the efficiency of processing image data compared with a single-byte reading.

In S402, the data group is copied according to the second length to generate the decompressed data set.

For example, in a case where the second length is set to be 0 in the process of obtaining the second image data through compression, starting from a first decompressed data group, each time the data group is copied, 1 is subtracted from the second length until the second length is 0, so as to obtain the decompressed data set. For example, the data group in the compression unit is (00001111), the second length is 3, and the first length is 1 (representing 1 byte). In this case, the data group (00001111) is obtained by reading 1 byte in the compression unit according to the first length. In a case where the second length is not 0, the data group is copied to obtain the decompressed data set (00001111, 00001111), and 1 is subtracted from the second length. That is, the second length is 2 (3−1=2). In the case where the second length is not 0, the data group continues to be copied to obtain the decompressed data set (00001111, 00001111, 00001111), and 1 is subtracted from the second length. That is, the second length is 1 (2−1=1). In the case where the second length is not 0, the data group continues to be copied to obtain the decompressed data set (00001111, 00001111, 00001111, 00001111), and 1 is subtracted from the second length. That is, the second length is 0 (1−1=0). In this case, the second length is equal to 0, and the data group stops being copied. The decompression of the compression unit is completed, and the number of data groups in the obtained decompressed data set is 4.

For example, in a case where the second length is set to be 0 in the process of obtaining the second image data through compression, the number of copying times is set to be 0. Starting from the first decompressed data group, each time the data group is copied, 1 is added to the number of copying times, until the number of copying times is equal to the value of the second length, thus the decompression of the compression unit is completed, and the decompressed data set is obtained. For example, the data group in the compression unit is (00001111), the second length is 3, and the first length is 1 (representing 1 byte). In this case, the data group (00001111) is obtained by reading 1 byte in the compression unit according to the first length. In a case where the number of copying times is not equal to the second length, the data group is copied to obtain the decompressed data set (00001111, 00001111), and 1 is added to the number of copying times. That is, the number of copying times is 1. In the case where the number of copying times is not equal to the second length, the data group continues to be copied to obtain the decompressed data set (00001111, 00001111, 00001111), and 1 is added to the number of copying times. That is, the number of copying times is 2 (1+1=2). In the case where the number of copying times is not equal to the second length, the data group continues to be copied to obtain the decompressed data set (00001111, 00001111, 00001111, 00001111), and 1 is added to the number of copying times. That is, the number of copying times is 3 (2+1=3). In this case, the number of copying times is equal to the second length, and the data group stops being copied. The decompression of the compression unit is completed, and the number of data groups in the obtained decompressed data set is 4.

For example, in a case where the second length is set to be 1 in the process of obtaining the second image data through compression, starting from the first decompressed data group, each time the data group is copied, 1 is subtracted from the second length until the second length is 1, so as to obtain the decompressed data set. For example, the data group in the compression unit is (00001111), the second length is 3, and the first length is 1 (representing 1 byte). In this case, the data group (00001111) is obtained by reading 1 byte in the compression unit according to the first length. In a case where the second length is not equal to 1, the data group is copied to obtain the decompressed data set (00001111, 00001111), and 1 is subtracted from the second length. That is, the second length is 2 (3−1=2). In the case where the second length is not equal to 1, the data group continues to be copied to obtain the decompressed data set (00001111, 00001111, 00001111), and 1 is subtracted from the second length. That is, the second length is 1 (2−1=1). In this case, the second length is equal to 1, and the data group stops being copied. The decompression of the compression unit is completed, and the number of data groups in the obtained decompressed data set is 3.

For example, in the case where the second length is set to be 1 in the process of obtaining the second image data through compression, the number of copying times is set to be 1. Starting from the decompressed first data group, each time the data group is copied, 1 is added to the number of copying times, until the number of copying times is equal to the value of the second length, thus the decompression of the compression unit is completed, and the decompressed data set is obtained. For example, the data group in the compression unit is (00001111), the second length is 3, and the first length is 1 (representing 1 byte). In this case, the data group (00001111) is obtained by reading 1 byte in the compression unit according to the first length. In a case where the number of copying times is not equal to the second length, the data group is copied to obtain the decompressed data set (00001111, 00001111), and 1 is added to the number of copying times. That is, the number of copying times is 2 (1+1=2). In a case where the number of copying times is not equal to the second length, the data group continues to be copied to obtain the decompressed data set (00001111, 00001111, 00001111), and 1 is added to the number of copying times. That is, the number of copying times is 3 (2+1=3). In this case, the number of copying times is equal to the second length, and the data group stops being copied. The decompression of the compression unit is completed, and the number of data groups in the obtained decompressed data set is 3.

Figure 15:
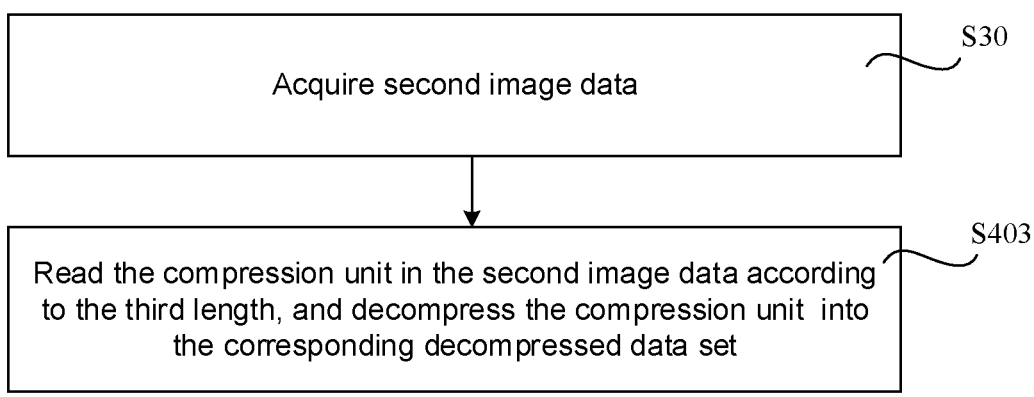
FIG. 15 is a flow diagram of yet another data processing method, in accordance with some embodiments.

In some embodiments, the compression parameter(s) further include a third length. The third length is configured to characterize the amount of the storage space of the compression unit. As shown in FIG. 15, decompressing the compression unit in the second image data into the corresponding decompressed data set according to the compression parameter(s) includes the following step (S403).

In S403, the compression unit in the second image data is read according to the third length, and the compression unit is decompressed into the corresponding decompressed data set.

For example, the data to be decompressed in the second image data is read according to the third length, so as to obtain the compression unit. For example, referring to FIG. 5, the compression unit occupies T bytes, and thus T bytes may be read at a time to obtain the compression unit in the second image data. In a case where the first length is S bytes, S bytes in the compression unit are read, thus the data group in the compression unit is obtained. Then the data group is copied according to (T−S) bytes in the compression unit to decompress the compression unit, thus the decompressed data set is obtained. In this way, compared with reading data in a single-byte manner, the efficiency of processing image data may be improved.

For example, the electronic device writes the decompressed data into the storage space in the process of decompression. For example, for a compression unit, when a data group is obtained through reading according to the first length, a first data group is written into the storage space. Then the second length is read, and the data group is repeatedly written according to the second length, so as to obtain the decompressed data set corresponding to the compression unit.

For example, in a case where the second image data includes the amount of data of all compression units as a whole (e.g., the amount of the storage space occupied by all compression units as a whole, or the total number of compression units), before reading the compression unit each time, the amount of data of the compression unit(s) that have been read may be compared with the amount of data of all compression units as a whole included in the second image data. If the amount of data of the compression unit(s) that have been read is less than the amount of data of all compression units as a whole included in the second image data, it means that the compression units in the second image data are not completely read, then the compression units continue to be read according to the third length. If the amount of data of the compression unit(s) that have been read is equal to the amount of data of all compression units as a whole included in the second image data, it means that the compression units in the second image data are completely read, then the compression units stop being read.

Figure 16:
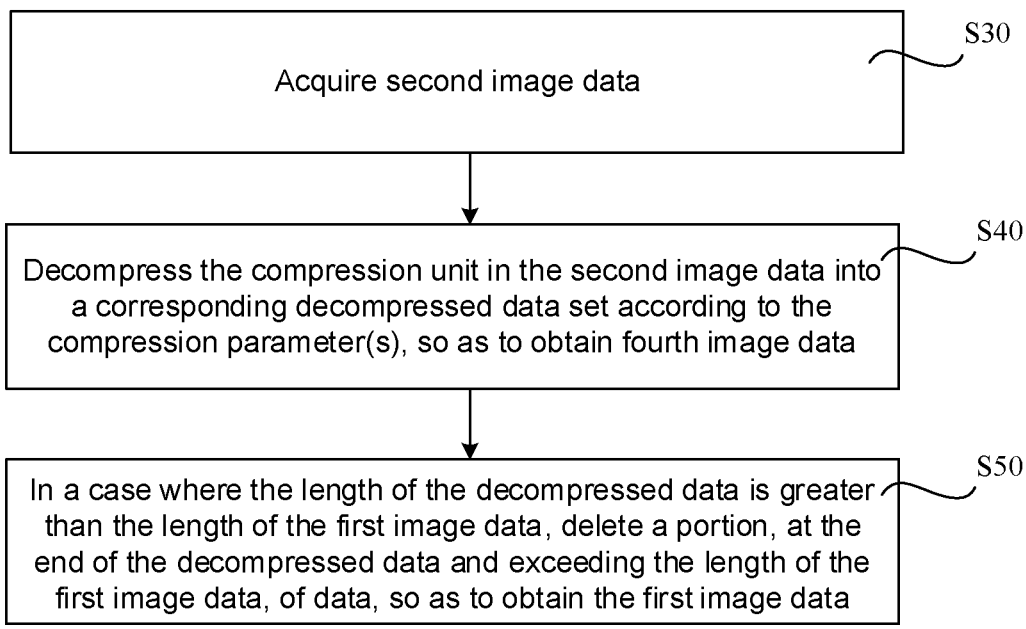
FIG. 16 is a flow diagram of yet another data processing method, in accordance with some embodiments.

In some embodiments, the second image data further includes a length of the first image data. As shown in FIG. 16, the data processing method includes the following step (S50).

In S50, in a case where the length of the decompressed data is greater than the length of the first image data, a portion, at the end of the decompressed data and exceeding the length of the first image data, of data is deleted, so as to obtain the first image data.

For example, in a case where the length of the first image data is 6 bytes, and the length of the decompressed data is 7 bytes, data of the 7th byte can be deleted, and data of the 1st to 6th bytes in the decompressed data is the first image data. Alternatively, data can be read from the first byte of the decompressed data until the length of the data is equal to the length of the first image data (i.e., the 6th byte), and the data of the 1st to 6th bytes in the decompressed data is the first image data. For example, for the electronic device at a sending end, in a case where zeros are written after the data to be compressed to complement the data to be compressed into one data group, after the complemented data group is decompressed, the length of the decompressed data is greater than the length of the first image data, the data written as zeros in the compression process is deleted, and the obtained decompressed data is the first image data. In this way, the data before compression is consistent with the data after decompression, which may ensure the accuracy of data processing.

It will be noted that, the electronic device (e.g., the second electronic device) includes a first memory and a second memory. For example, the first memory is a random access memory (RAM), and the second memory is a flash memory. For example, in the process of decompressing the second image data, for the decompression of each compression unit, intermediate data may be stored in the first memory, and the data groups obtained through decompression may be stored in the second memory. That is, the decompressed data set is stored in the second memory, and the first memory does not store a corresponding decompressed data set therein. Alternatively, the first memory may also store data groups of the compression units, after the compression units are decompressed, the decompressed data sets each including the data group are stored in the second memory.

Figure 17:
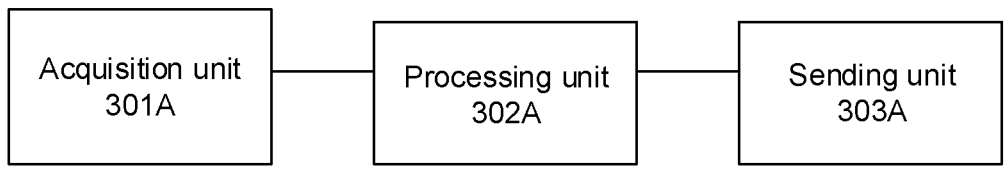
FIG. 17 is a structural diagram of a data processing apparatus, in accordance with some embodiments.

Embodiments of the present disclosure provide a data processing device 300A. As shown in FIG. 17, the data processing device 300A includes an acquisition unit 301A and a processing unit 302A.

The acquisition unit 301A is configured to acquire first image data. The first image data includes a plurality of pixel values that are arranged consecutively. The plurality of pixel values are divided into a plurality of data blocks according to an arranging order of the pixel values, and each data block occupies one byte and includes at least one pixel value.

The processing unit 302A is configured to compress at least one data set to be compressed in the first image data into a corresponding compression unit according to compression parameter(s), so as to obtain second image data including the compression unit. A data set to be compressed includes at least one data group. In a case where the data set to be compressed includes at least two data groups, the at least two data groups are arranged consecutively and identical. Each data group includes at least one data block. In a case where the data group includes at least two data blocks, the at least two data blocks are arranged consecutively.

The compression parameter(s) include a first length. The first length is configured to characterize the number of data block(s) in a data group. The compression unit includes one data group in the data set to be compressed and a second length. The second length is configured to characterize the number of data group(s) in the data set to be compressed.

In some embodiments, as shown in FIG. 17, the data processing device 300A further includes a sending unit 303A. The sending unit 303A is configured to send the second image data to a electronic device 100 (e.g., the second electronic device 100B).

It will be noted that, the above data processing device can implement some of the above data processing methods, for example, the data processing method for compressing the first image data. The above data processing device has the same beneficial effects as some of the above data processing methods, which is not repeated here.

Figure 18:
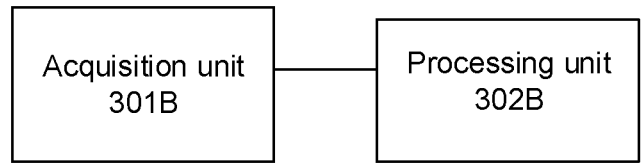
FIG. 18 is a structural diagram of another data processing apparatus, in accordance with some embodiments.

Embodiments of the present disclosure provide a data processing device 300B. As shown in FIG. 18, the data processing device 300B includes an acquisition unit 301B and a processing unit 302B.

The acquisition unit 301B is configured to acquire second image data. The second image data includes at least one compression unit, and the compression unit includes one data group and a second length.

The processing unit 302B is configured to decompress the compression unit in the second image data into a corresponding decompressed data set according to the compression parameter(s), so as to obtain fourth image data. The compression parameter(s) includes a first length, and the first length is configured to characterize the number of data block(s) in the data group. The second length is configured to characterize the number of data group(s) in the decompressed data set corresponding to the compression unit.

The decompressed data set includes at least one data group. In a case where the decompressed data set includes at least two data groups, the at least two data groups are arranged consecutively. Each data group includes at least one data block. In a case where the data group includes at least two data blocks, the at least two data blocks are arranged consecutively. The fourth image data includes a plurality of data blocks that are arranged consecutively, and each data block includes a plurality of pixel values that are arranged consecutively.

For example, the second image data further includes a length of the first image data. The processing unit 302B is further configured to, in a case where the length of the decompressed data is greater than the length of the first image data, delete a portion, at the end of the decompressed data and exceeding the length of the first image data, of data, so as to obtain the first image data.

It will be noted that, the above data processing device can implement some of the above data processing methods, for example, the data processing method for decompressing the second image data. The above data processing device has the same beneficial effects as some of the above data processing methods, which is not repeated here.

The description of the embodiments of the devices described according to FIGS. 17 and 18 is merely schematic. For example, the division of the above units is merely a kind of logical functional division, and there may be other division methods in practical implementation. For example, a plurality of modules or components may be combined or may be integrated into another system, or some features may be ignored or not executed. The functional units in the embodiments of the present disclosure may be integrated into a single processing module or may be separate physical units, alternatively, two or more units may be integrated into a single module. The above units in FIGS. 17 and 18 may be implemented in a form of hardware or in a form of software functional unit. For example, in a case where the units are implemented in the form of software, the acquisition unit 301A or 301B, the processing unit 302A or 302B, and the like may be implemented by a software functional module generated after at least one processor reads the program code stored in the memory. The above units in FIGS. 17 and 18 may also be implemented by different hardware in a computer (a display apparatus). For example, the processing unit 302A or 302B is implemented by part of processing resources in at least one processor (e.g., one core or two cores in a multi-core processor), while the acquisition unit 301A or 301B is implemented by remaining parts of processing resources in the at least one processor (e.g., other cores in the multi-core processor). For example, the acquisition unit 301A or 301B is implemented in the form of hardware. For example, in a case where the hardware is used for implementation, the above data processing device 300A or 300B may be a programmable device, such as a hardware programmable device (e.g., a field programmable gate array (FPGA)). The above functional units may also be implemented in a form of a combination of software and hardware. For example, the acquisition unit 301A or 301B, the processing unit 301A or 301B, and the like are implemented by software functional modules generated after a CPU reads the program codes stored in the memory.

For more details of the above functions implemented by the acquisition units 301A and 301B, the processing units 301A and 301B and the like in FIGS. 17 and 18, reference may be made to the descriptions in the foregoing method embodiments, which will not be repeated here.

The embodiments in the specification are described in a progressive manner. The same or similar parts between the embodiments may be referred to each other. Each embodiment focuses on differences from other embodiments.

The above embodiments may be implemented in whole or in part through software, hardware, firmware, or any combination thereof. When the above embodiments are implemented by using a software program, the software program may be implemented in a form of a computer program product in whole or in part. The computer program product has one or more computer instructions therein. When the computer instructions are loaded and executed by a computer, the processes or functions according to the embodiments of the present disclosure are generated in whole or in part. The computer may be a general-purpose computer, a special-purpose computer, a computer network, or any other programmable device. The computer instructions may be stored in a computer-readable storage medium. The computer-readable storage medium may be any available medium that may be accessed by a computer, or a data storage device such as a server including one or more available media or a data center including one or more available media. The available medium may be a magnetic medium (e.g., a floppy disk, a magnetic disc or a magnetic tape), an optical medium (e.g., a digital versatile disc (DVD)), or a semiconductor medium (e.g., a solid state drive (SSD)), etc.

Some embodiments of the present disclosure provide a non-transient computer-readable storage medium (e.g., a non-transitory computer-readable storage medium). The non-transient computer-readable storage medium has stored thereon computer program instructions that, when run on a computer, cause the computer to perform one or more steps of the data processing methods as described in the above embodiments.

For example, the computer-readable storage medium includes but is not limited to, a magnetic storage device (e.g., a hard disc, a floppy disk or a magnetic tape), an optical disc (e.g., a compact disk (CD), a digital versatile disc (DVD)), a smart card, a flash memory device (e.g., an erasable programmable read-only memory (EPROM), a card, a stick or a key driver). Various computer-readable storage media described in embodiments of the present disclosure may represent one or more devices and/or other machine-readable storage media, which are used for storing information. The term "machine-readable storage media" may include, but is not limited to, wireless channels and various other media capable of storing, containing and/or carrying instructions and/or data.

Some embodiments of the present disclosure further provide a computer program product. The computer program product includes computer program instructions that, when executed by a computer, cause the computer to perform one or more steps of the data processing methods as described in the above embodiments.

Some embodiments of the present disclosure further provide a computer program. When the computer program is executed by the computer, the computer program causes the computer to perform one or more steps of the data processing methods as described in the above embodiments.

Beneficial effects of the computer-readable storage medium, the computer program product and the computer program are the same as the beneficial effects of the data processing methods as described in some of the above embodiments, which will not be described here again.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A data processing method, comprising:
acquiring first image data; the first image data including a plurality of pixel values that are arranged consecutively, the plurality of pixel values being divided into a plurality of data blocks according to an arranging order of the pixel values, and each data block occupying one byte and including at least one pixel value; and
compressing at least one data set to be compressed in the first image data into a corresponding compression unit according to at least one compression parameter, so as to obtain second image data including the compression unit, wherein
a data set to be compressed includes at least two data groups that are arranged consecutively and identical; each data group includes any of a single data block and at least two data blocks arranged consecutively;
the at least one compression parameter includes a first length, the first length is configured to characterize a number of at least one data block in a data group; the compression unit includes one data group in the data set to be compressed and a second length, the second length is configured to characterize a number of the at least two data groups in the data set to be compressed;
wherein compressing the at least one data set to be compressed in the first image data into the corresponding compression unit according to the at least one compression parameter includes:
in a case where the data to be compressed of the first image data is not empty, and a number of bytes occupied by the data to be compressed is less than a number of bytes occupied by one data group, writing zeros after the data to be compressed, so as to complement the data to be compressed into one data group.

2. The data processing method according to claim 1, wherein compressing the at least one data set to be compressed in the first image data into the corresponding compression unit according to the at least one compression parameter includes:
reading, from data to be compressed of the first image data, data groups sequentially according to the first length;
determining, from a first data group, whether a next data group is identical to a current data group one by one, until the next data group is different from the current data group, or a number of identical data groups exceeds a set value, wherein the identical data groups constitute the data set to be compressed including the at least two data groups; and
generating, according to one data group in the identical data groups and the second length, a compression unit corresponding to the data set to be compressed.

3. The data processing method according to claim 2, wherein compressing the at least one data set to be compressed in the first image data into the corresponding compression unit according to the at least one compression parameter further includes:
setting the second length to be 0 or 1; and
adding, from the first data group, 1 to the second length in response to determining that the next data group is identical to the current data group, until the next data group is different from the current data group, or the number of the identical data groups exceeds the set value, so as to obtain the second length that characterizes the number of the identical data groups in the data set to be compressed.

4. The data processing method according to claim 2, wherein the at least one compression parameter further includes a third length; the third length is configured to characterize an amount of storage space of the compression unit; generating, according to one data group in the identical data groups and the second length, the compression unit corresponding to the data set to be compressed includes:
writing one data group in the data set to be compressed and the second length into storage space having the third length, so as to generate the compression unit corresponding to the data set to be compressed.

5. The data processing method according to claim 2, wherein the data group included in the compression unit is the first data group in the data set to be compressed.

6. The data processing method according to claim 2, wherein reading, from the data to be compressed of the first image data, the data groups sequentially according to the first length includes:
other than the first data group, comparing a length of processed data with a length of the first image data before each data group is obtained; and
in response to determining that the length of the processed data is less than the length of the first image data, obtaining a data group from the data to be compressed of the first image data.

7. The data processing method according to claim 2, wherein the at least one compression parameter includes a plurality groups of compression parameters, and the plurality groups of compression parameters are not exactly same; compressing the at least one data set to be compressed in the first image data into the corresponding compression unit according to the at least one compression parameter, so as to obtain the second image data including the compression unit includes:
compressing the data set to be compressed in the first image data into the corresponding compression unit according to at least one compression parameter in each of the plurality groups of compression parameters, so as to generate a plurality of third image data each including the compression unit; and
selecting, from the plurality of third image data, third image data with a smallest length or third image data with a length less than a threshold as the second image data.

8. The data processing method according to claim 1, wherein the second image data further includes the at least one compression parameter.

9. The data processing method according to claim 1, wherein the number of the at least one data block included in the data group is any of 1 to 4.

10. A data processing method, comprising:
acquiring second image data; the second image data including at least one compression unit, and the compression unit including one data group and a second length; and
decompressing the compression unit in the second image data into a corresponding decompressed data set according to at least one compression parameter, so as to obtain fourth image data; the at least one compression parameter including a first length, the first length being configured to characterize a number of at least one data block in the data group; the second length being configured to characterize a number of data groups in a decompressed data set corresponding to the compression unit, wherein the decompressed data set includes at least two data groups that are arranged consecutively; each data group includes any of a single data block and at least two data blocks arranged consecutively; the fourth image data includes a plurality of data blocks that are arranged consecutively, and each data block includes at least one of a plurality of pixel values that are arranged consecutively;

wherein the second image data further includes a length of first image data; the data processing method further comprises:

in a case where a length of decompressed data is greater than a length of the first image data, deleting a portion, at an end of the decompressed data and exceeding the length of the first image, of data, so as to obtain the first image data.

11. The data processing method according to claim 10, wherein decompressing the compression unit in the second image data into the corresponding decompressed data set according to the at least one compression parameter includes:

reading the data group in the compression unit according to the first length; and copying the data group according to the second length, so as to generate the decompressed data set.

12. The data processing method according to claim 10, wherein the at least one compression parameter further includes a third length; the third length is configured to characterize an amount of storage space of the compression unit; decompressing the compression unit in the second image data into the corresponding decompressed data set according to the at least one compression parameter further includes:

reading the compression unit in the second image data according to the third length, and decompressing the compression unit into the corresponding decompressed data set.

13. An electronic device, comprising:
a memory; the memory having stored therein one or more computer program instructions; and
a processor; the processor being coupled to the memory; the processor being configured to execute the one or more computer program instructions, so that the electronic device implements the data processing method according to claim 1.

14. A data processing system, comprising:
a first electronic device configured to perform the data processing method according to claim 1; and
a second electronic device coupled to the first electronic device.

15. A non-transient computer-readable storage medium having stored computer program instructions thereon, wherein the computer program instructions, when run on a computer, cause the computer to perform the data processing method according to claim 1.

16. An electronic device, comprising:
a memory; the memory having stored therein one or more computer program instructions; and
a processor; the processor being coupled to the memory; the processor being configured to execute the one or more computer program instructions, so that the electronic device implements the data processing method according to claim 10.

17. A data processing system, comprising:
a first electronic device; and
a second electronic device coupled to the first electronic device; the second electronic device being configured to perform the data processing method according to claim 10.

18. A non-transient computer-readable storage medium having stored computer program instructions thereon, wherein the computer program instructions, when run on a computer, cause the computer to perform the data processing method according to claim 10.

* * * * *